United States Patent
Park et al.

(10) Patent No.: US 11,870,584 B2
(45) Date of Patent: *Jan. 9, 2024

(54) METHOD AND APPARATUS FOR GRANT FREE BASED DATA TRANSMISSION IN WIRELESS COMMUNICATION SYSTEM

(71) Applicant: Samsung Electronics Co., Ltd., Suwon-si (KR)

(72) Inventors: Sungjin Park, Suwon-si (KR); Jinyoung Oh, Suwon-si (KR); Hyunseok Ryu, Suwon-si (KR); Jonghyun Bang, Suwon-si (KR); Cheolkyu Shin, Suwon-si (KR); Jeongho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

This patent is subject to a terminal disclaimer.

(21) Appl. No.: 17/991,200

(22) Filed: Nov. 21, 2022

(65) Prior Publication Data

US 2023/0291505 A1    Sep. 14, 2023

Related U.S. Application Data

(63) Continuation of application No. 16/832,294, filed on Mar. 27, 2020, now Pat. No. 11,509,424.

(30) Foreign Application Priority Data

Apr. 1, 2019  (KR) .................. 10-2019-0037803
Jun. 4, 2019  (KR) .................. 10-2019-0065875

(51) Int. Cl.
*H04W 28/04*  (2009.01)
*H04W 72/04*  (2023.01)
(Continued)

(52) U.S. Cl.
CPC .......... *H04L 1/1812* (2013.01); *H04W 72/23* (2023.01)

(58) Field of Classification Search
CPC ... H04W 28/04; H04W 72/04; H04W 72/042; H04W 88/08; H04W 72/23; H04L 5/0007; H04L 1/1812
(Continued)

(56) References Cited

U.S. PATENT DOCUMENTS 10,673,593 B2   6/2020  Cao et al.
2010/0067457 A1  3/2010  Wang et al.
(Continued)

FOREIGN PATENT DOCUMENTS

EP    3 879 736 A1    9/2021
WO    2019/050368 A1  3/2019
WO    2020/197195 A1  10/2020

OTHER PUBLICATIONS

Oppo, Correction to Type-1 HARQ-ACK codebook for only one reception, R1-1902749, 3GPP TSG RAN WG1 Meeting #96, Athens, Greece, Feb. 15, 2019, section 9.1.2.
(Continued)

*Primary Examiner* — Peter G Solinsky
*Assistant Examiner* — Sanjay K Dewan
(74) *Attorney, Agent, or Firm* — Jefferson IP Law, LLP

(57) ABSTRACT

A communication method and system for converging a $5^{th}$-Generation (5G) communication system for supporting higher data rates beyond a $4^{th}$-Generation (4G) system with a technology for Internet of Things (IoT) is provided. The communication method includes intelligent services based on the 5G communication technology and the IoT-related technology, such as smart home, smart building, smart city, smart car, connected car, health care, digital education, smart retail, security and safety services. This disclosure
(Continued)

provides a grant-free-based data transmission method and apparatus.

16 Claims, 14 Drawing Sheets

(51) Int. Cl.
  *H04W 88/08* (2009.01)
  *H04L 5/00* (2006.01)
  *H04L 1/1812* (2023.01)
  *H04W 72/23* (2023.01)
(58) Field of Classification Search
  USPC ............................................................ 370/329
  See application file for complete search history.

(56) References Cited

U.S. PATENT DOCUMENTS

| | | |
|---|---|---|
| 2011/0103336 A1 | 5/2011 | Ishii et al. |
| 2012/0307758 A1 | 12/2012 | Moon et al. |
| 2014/0003302 A1 | 1/2014 | Han et al. |
| 2014/0328292 A1 | 11/2014 | Yang et al. |
| 2015/0156764 A1 | 6/2015 | Yang et al. |
| 2018/0160413 A1 | 6/2018 | Papasakellariou |
| 2018/0317213 A1 | 11/2018 | Islam et al. |
| 2019/0037586 A1 | 1/2019 | Park et al. |
| 2019/0097762 A1 | 3/2019 | Jeon et al. |
| 2019/0150123 A1 | 5/2019 | Nogami et al. |
| 2019/0150184 A1 | 5/2019 | Golitschek Edler Von Elbwart et al. |
| 2019/0158205 A1 | 5/2019 | Sheng et al. |
| 2019/0230691 A1 | 7/2019 | Cao et al. |
| 2019/0261354 A1 | 8/2019 | Fakoorian et al. |
| 2019/0313436 A1 | 10/2019 | Lee et al. |
| 2020/0037314 A1 | 1/2020 | Xiong et al. |
| 2020/0221429 A1 | 7/2020 | Li et al. |
| 2021/0184803 A1* | 6/2021 | Ge .................. H04L 1/1887 |
| 2021/0344455 A1 | 11/2021 | Choi et al. |
| 2022/0141853 A1* | 5/2022 | Dinan ............... H04L 1/1822 370/329 |

OTHER PUBLICATIONS

Motorola Mobility et al., UCI enhancement for URLLC, R1-1902844, 3GPP TSG RAN WG1 Meeting #96, Athens, Greece, Feb. 16, 2019, section 2.
CATT, Corrections to UCI feedback, R1-1901978, 3GPP TSG RAN WG1 Meeting #96, Athens, Greece, Feb. 16, 2019, section 2.3.
International Search Report dated Jul. 6, 2020, issued in International Application No. PCT/KR2020/004366.
Qualcomm Incorporated, "Summary of DL/UL scheduling and HARQ management", 3GPP Draft, R1-1805540_Summary-7.1.3.2.2-Scheduling-HARQMGMT_V6, 3rd Generation Partnership Project (3GPP), vol. RAN WG1, Sanya, China, Apr. 16, 2018-Apr. 20, 2018, Apr. 17, 2018, XP051427608.
Samsung, "Specification Update on HARQ-ACK Codebooks Incorporating Proposals in RAN1#94", 3GPP Draft, R1-1809706 38213-F20_HARQ-ACK CB, 3rd Generation Partnership Project (3GPP), vol. RAN WG1, Gothenburg, Sweden, Aug. 20, 2018-Aug. 24, 2018, Aug. 21, 2018, XP051517057.
Extended European Search Report dated Dec. 1, 2021, issued in European Patent Application No. 20782241.2.

* cited by examiner

METHOD AND APPARATUS FOR GRANT FREE BASED DATA TRANSMISSION IN WIRELESS COMMUNICATION SYSTEM

CROSS-REFERENCE TO RELATED APPLICATION(S)

This application a continuation application of prior application Ser. No. 16/832,294 filed on Mar. 27, 2020, which issued as U.S. Pat. No. 11,509,424 on Nov. 22, 2022, and which claims priority under 35 U.S.C. § 119(a) of a Korean patent application number 10-2019-0037803, filed on Apr. 1, 2019, in the Korean Intellectual Property Office, and of a Korean patent application number 10-2019-0065875, filed on Jun. 4, 2019, in the Korean Intellectual Property Office, the disclosure of each of which is incorporated by reference herein in its entirety.

BACKGROUND

1. Filed

The disclosure relates to a wireless communication system. More particularly, the disclosure relates to a method and an apparatus for grant-free based data transmission in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'. Further, the 5G communication system is also called a "new radio access technology (NR) system".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques have been discussed in the 5G communication system and reflected in the NR system.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The 5G communication systems have been developed to provide various services, and as a variety of services are provided, a method for efficiently providing these services is required. Accordingly, research on grant-free based communication has been actively conducted.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an embodiment for efficiently using radio resources and performing grant-free based data transmission and reception will be described. In particular, a downlink grant-free-based data transmission and reception method and an uplink grant-free-based data transmission and reception method will be described.

Additional aspects will be set forth in part in the description which follows and, in part, will be apparent from the description, or may be learned by practice of the presented embodiments.

In accordance with an aspect of the disclosure, a method performed by a terminal is provided. The method includes receiving, from a base station, downlink control information (DCI) indicating a plurality of semi persistent scheduling (SPS) physical downlink shared channel (PDSCH) releases, obtain a hybrid automatic repeat request acknowledgement (HARQ-ACK) codebook including a HARQ-ACK information bit corresponding to the DCI, and transmitting, to the base station, the HARQ-ACK codebook, wherein a location in the HARQ-ACK codebook for the HARQ-ACK information bit corresponding to the DCI is same as for a corresponding SPS PDSCH reception with a lowest SPS index among the plurality of SPS PDSCH releases.

In accordance with another aspect of the disclosure, a method performed by a base station is provided. The method includes transmitting, to a terminal, downlink control information (DCI) indicating a plurality of semi persistent scheduling (SPS) physical downlink shared channel (PDSCH) releases, and receiving, from the terminal, a hybrid automatic repeat request acknowledgement (HARQ-ACK) codebook including a HARQ-ACK information bit corresponding to the DCI, wherein a location in the HARQ-ACK codebook for the HARQ-ACK information bit corresponding to the DCI is same as for a corresponding SPS PDSCH reception with a lowest SPS index among the plurality of SPS PDSCH releases.

In accordance with another aspect of the disclosure, a terminal is provided. The terminal includes a transceiver configured to transmit and receive a signal; and a controller configured to: receive, from a base station, downlink control information (DCI) indicating a plurality of semi persistent scheduling (SPS) physical downlink shared channel (PDSCH) releases, obtain a hybrid automatic repeat request acknowledgement (HARQ-ACK) codebook including a HARQ-ACK information bit corresponding to the DCI, and transmit, to the base station, the HARQ-ACK codebook, wherein a location in the HARQ-ACK codebook for the HARQ-ACK information bit corresponding to the DCI is same as for a corresponding SPS PDSCH reception with a lowest SPS index among the plurality of SPS PDSCH releases.

In accordance with another aspect of the disclosure, a base station is provided. The base station includes a transceiver configured to transmit and receive a signal; and a controller configured to: transmit, to a terminal, downlink control information (DCI) indicating a plurality of semi persistent scheduling (SPS) physical downlink shared channel (PDSCH) releases, and receive, from the terminal, a hybrid automatic repeat request acknowledgement (HARQ-ACK) codebook including a HARQ-ACK information bit corresponding to the DCI, wherein a location in the HARQ-ACK codebook for the HARQ-ACK information bit corresponding to the DCI is same as for a corresponding SPS PDSCH reception with a lowest SPS index among the plurality of SPS PDSCH releases.

According to the disclosed embodiments, radio resources can be efficiently used, and various services can be efficiently provided to users according to a priority.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
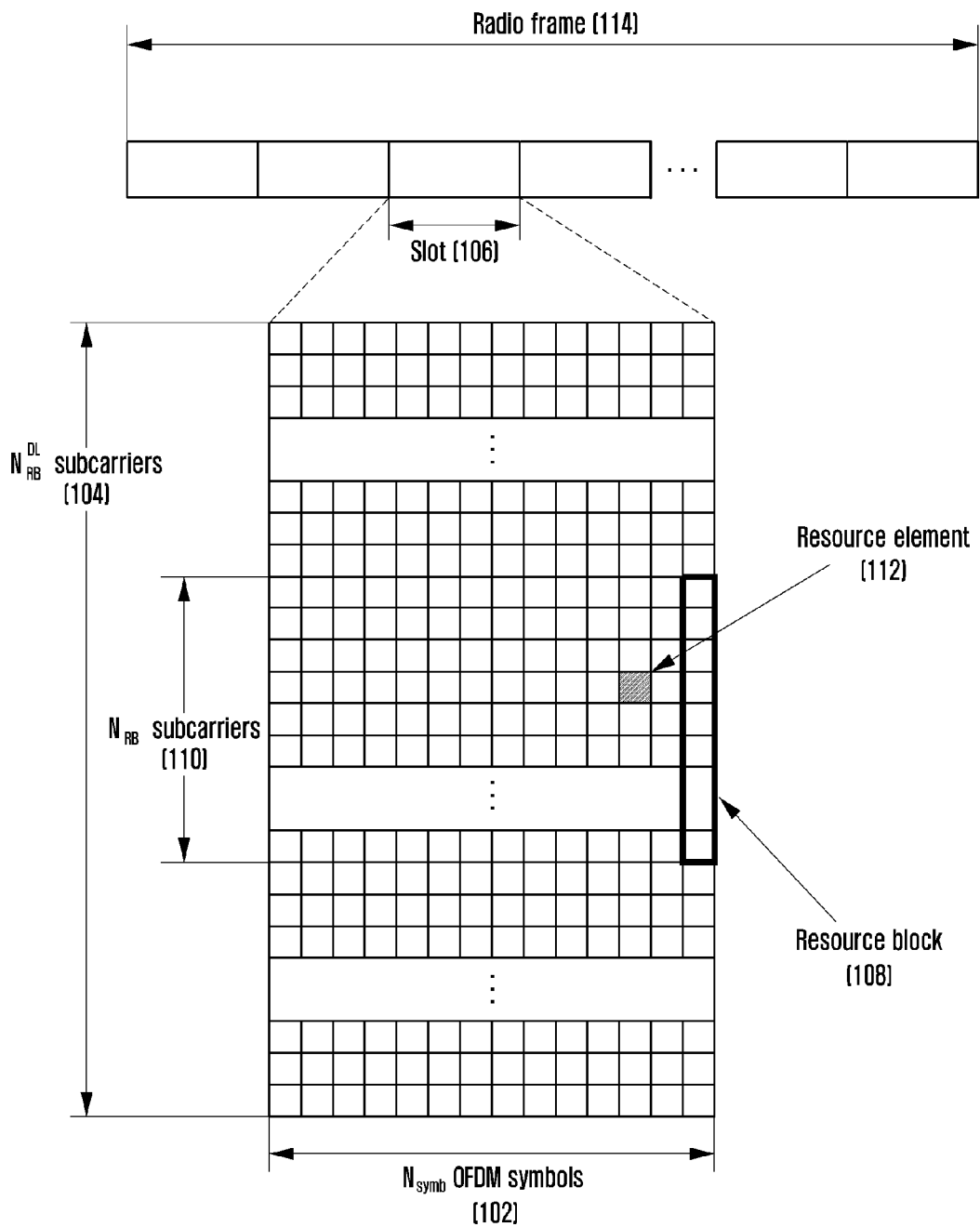
FIG. 1 is a view illustrating a transmission structure of a time-frequency domain that is a radio resource region of a $5^{th}$ generation (5G) or new radio (NR) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

The wireless communication system is advancing to a broadband wireless communication system for providing high-speed and high-quality packet data services using communication standards, such as high-speed packet access (HSPA) of 3rd generation partnership project (3GPP), long-term evolution (LTE) or evolved universal terrestrial radio access (E-UTRA), LTE-advanced (LTE-A), high-rate packet data (HRPD) of 3GPP2, ultra-mobile broadband (UMB), IEEE 802.16e, and the like, as well as typical voice-based services. In addition, 5G or new radio communication standards are being established as $5^{th}$ generation wireless communication systems.

As a representative example of a broadband wireless communication system, 5G or NR systems adopt an orthogonal frequency division multiplexing (OFDM) scheme in downlink (DL) and uplink (UL). More specifically, a cyclic-prefix OFDM (CP-OFDM) scheme was adopted in the downlink, and a discrete Fourier transform spreading OFDM (DFT-S-OFDM) scheme was adopted in the uplink in addition to the CP-OFDM. Uplink refers to a radio link through which a terminal transmits data or control signals to a base station, and downlink refers to a radio link through which a base station transmits data or control signals to a terminal. In such a multiple access method, data or control information of each user is usually divided by assigning and operating so that time-frequency resources to which data or control information to be carried for each user do not overlap, that is, orthogonality is established.

The 5G or NR system employs a hybrid automatic repeat request (HARQ) scheme that retransmits the corresponding data in a physical layer when a decoding failure occurs in the initial transmission. In the HARQ scheme, when a receiver fails to correctly decode data, the receiver transmits information (negative acknowledgement (NACK)) to a transmitter to inform the transmitter of the decoding failure, so that the transmitter can retransmit the corresponding data in the physical layer. The receiver increases data reception performance by combining data retransmitted by the transmitter with data that has previously failed decoding. In addition, when the receiver correctly decodes the data, the receiver may transmit information (ACK) indicating the decoding success to the transmitter so that the transmitter can transmit new data.

Meanwhile, the NR system, which is a new 5G communication system, is designed to allow multiple services to be freely multiplexed in time and frequency resources. Accordingly, a waveform, a numerology, a reference signal, or the like can be allocated dynamically or freely depending on the needs of the corresponding service. Meanwhile, in the 5G or NR system, the types of supported services may be divided into categories such as enhanced mobile broadband (eMBB), massive machine type communications (mMTC), and ultra-reliable and low-latency communications (URLLC). The eMBB is a high-speed transmission of high-capacity data, the mMTC is a service aimed at minimizing terminal power and accessing multiple terminals, and URLLC is aiming for high reliability and low latency. Different requirements may be applied depending on the type of service applied to the terminal.

In the disclosure, each term is defined in consideration of each function, which may vary according to a user's or operator's intention or practice. Therefore, the definition should be made based on the contents throughout this specification. Hereinafter, the base station is a subject that performs resource allocation of a terminal, and may be at least one of a gNode B (gNB), an eNode B (eNB), a Node B, a base station (BS), a radio access unit, a base station controller, or a node on a network. The terminal may include a user equipment (UE), a mobile station (MS), a cellular phone, a smart phone, a computer, or a multimedia system capable of performing communication functions. Hereinafter, the NR system will be described as an example in the disclosure, but is not limited thereto, and embodiments of the disclosure may be applied to various communication systems having similar technical backgrounds or channel types. In addition, the embodiments of the disclosure may be applied to other communication systems via some modifications within a range that does not significantly depart from the scope of the disclosure by the judgment of a person having skilled technical knowledge.

In the disclosure, the terms of physical channel of the related art and signal may be used interchangeably with data or control signals. For example, physical downlink shared channel (PDSCH) is a physical channel through which data is transmitted, but in the disclosure, PDSCH may be referred to as data. That is, PDSCH transmission and reception can be understood as data transmission and reception.

In the disclosure, the higher signaling (or a higher signal, or it can be interchangeably used with higher signal, higher layer signal, and higher layer signaling) is a signal transmission method transmitted from a base station to a terminal using a downlink data channel of a physical layer or from a terminal to a base station using an uplink data channel of a physical layer, and may also be referred to as radio resource control (RRC) signaling or medium access control (MAC) control element (CE).

Recently, as studies on the 5G communication system have been conducted, various methods for scheduling communication with a terminal are being discussed. In accordance with this, an efficient scheduling and data transmission/reception method considering characteristics of the 5G communication system is required. Accordingly, in order to provide a plurality of services to a user in a communication system, a method capable of providing each service within the same time period according to the characteristics of the service and an apparatus using the same are required.

A terminal should receive separate control information from a base station to transmit or receive data to the base station. However, in the case of periodically generated traffic or a service type requiring low latency and/or high reliability, it may be possible to transmit or receive data without the separate control information. This transmission method is referred to as a configured grant (configured grant or grant-free or configured scheduling) based data transmission method in the disclosure. The method of receiving or transmitting data after configuring the data transmission resource configuration and receiving the related information via the control information may be referred to as a first signal transmission/reception type, and a method of transmitting or receiving data, based on preconfigured information without the control information may be referred to as a second signal transmission/reception type. For the second signal transmission/reception type, predetermined resource regions are periodically present, and there are an uplink (UL) type 1 grant, which is a method configured only as a higher signal, and an uplink (UL) type 2 grant (or semi-persistent scheduling (SPS)), which is a combination of a higher signal and an L1 signal (i.e., downlink control information (DCI)) in these regions. In the case of UL type 2 grant (or SPS), some information is a higher signal and whether actual data is transmitted is determined by an L1 signal. Here, the L1 signal can be largely divided into a signal indicating activation of a resource configured as a higher signal indicating release of the activated resource again.

In a case that the DL SPS transmission period is aperiodic or smaller than 1 slot, the disclosure includes a method for determining a corresponding semi-static HARQ-ACK codebook and a dynamic HARQ-ACK and a method for transmitting HARQ-ACK information.

FIG. 1 is a view illustrating a transmission structure of a time-frequency domain that is a radio resource region of a 5G or NR system according to an embodiment of the disclosure.

Referring to FIG. 1, the horizontal axis in the radio resource region represents a time domain and the vertical axis represents a frequency domain. The minimum transmission unit in the time domain is an OFDM symbol, and $N_{symb}$ OFDM symbols 102 are collected to form one slot 106. The length of the subframe may be defined as 1.0 ms, and the radio frame 114 may be defined as 10 ms. The minimum transmission unit in the frequency domain is a subcarrier, and the bandwidth of the entire system transmission band may be composed of a total of $N_{BW}$ subcarriers 104. However, these specific values may be variably applied depending on the system.

The basic unit of the time-frequency resource region is a resource element (RE) 112 and may be represented by an OFDM symbol index and a subcarrier index. Resource block (RB) 108 may be defined as $N_{RB}$ consecutive subcarriers 110 in the frequency domain.

Generally, the minimum transmission unit of data is an RB unit. In a 5G or NR system, Nsymb=14 and NRB=12 are generally used, and $N_{BW}$ may be proportional to the bandwidth of the system transmission band. The data rate increases in proportion to the number of RBs scheduled for the terminal. In a 5G or NR system, in the case of an FDD system that operates by dividing downlink and uplink into frequencies, the downlink transmission bandwidth and the uplink transmission bandwidth may be different. The channel bandwidth represents an RF bandwidth corresponding to the system transmission bandwidth. Table 1 below shows the correspondence between the system transmission bandwidth and channel bandwidth defined in the LTE system, which is a 4G wireless communication before the 5G or NR system.

For example, in an LTE system having a 10 MHz channel bandwidth, the transmission bandwidth is composed of 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

In a 5G or NR system, a channel bandwidth wider than that of LTE shown in Table 1 may be employed. Table 2 shows the correspondence between the system transmission bandwidth and the channel bandwidth and subcarrier spacing (SCS) in a 5G or NR system.

TABLE 2

| SCS | Channel bandwidth $BW_{Channel}$ [MHz] | | | | | | | | | |
|---|---|---|---|---|---|---|---|---|---|---|
| [kHz] | 5 | 10 | 15 | 20 | 25 | 40 | 50 | 60 | 80 | 100 |
| Maximum Transmission bandwidth $N_{RB}$ 15 | 25 | 52 | 79 | 106 | 133 | 216 | 270 | N.A. | N.A. | N.A. |
| 30 | 11 | 24 | 38 | 51 | 65 | 106 | 133 | 162 | 217 | 273 |
| 60 | N.A. | 11 | 18 | 24 | 31 | 51 | 65 | 79 | 107 | 135 |

In a 5G or NR system, the scheduling information for downlink data or uplink data is transmitted from a base station to a terminal via downlink control information (DCI). The DCI is defined according to various formats, and whether the DCI is scheduling information for uplink data (UL grant) or scheduling information for downlink data (DL grant), whether the DCI is compact DCI having a small control information size, whether spatial multiplexing using multiple antennas is applied, whether the DCI is for power control, or the like may be indicated, according to each format. For example, DCI format 1_1, which is scheduling control information (DL grant) for downlink data, may include at least one of the following control information.

Carrier Indicator: Indicates which Frequency Carrier is Transmitted.

DCI format indicator: is an indicator to distinguish whether the corresponding DCI is for downlink or uplink.

Bandwidth part (BWP) indicator: indicates which BWP is being transmitted.

Frequency domain resource allocation: indicates the RB of the frequency domain allocated for data transmission. The resources to be expressed are determined according to the system bandwidth and resource allocation method.

Time domain resource allocation: indicates data related channel is to be transmitted in which OFDM symbol in which slot.

VRB-to-PRB mapping: indicates how to map the virtual RB index and the physical RB (PRB) index.

Modulation and coding scheme (MCS): indicates the modulation scheme and coding rate used for data transmission. That is, in addition to information on whether it is quadrature phase shift keying (QPSK), 16 quadrature amplitude modulation (QAM), 64QAM, or 256QAM, a coding rate value that can inform transport block size (TBS) and channel coding information may be indicated.

Codeblock group (CBG) transmission information: indicates information about which CBG is transmitted, when CBG retransmission is configured.

HARQ process number: indicates the process number of the HARQ.

New data indicator: indicates whether it is the HARQ initial transmission or retransmission.

Redundancy version: indicates a redundancy version of HARQ.

Physical uplink control channel (PUCCH) resource indicator (PUCCH resource indicator): indicates a PUCCH resource that transmits ACK/NACK information for downlink data.

PDSCH-to-HARQ feedback timing indicator: indicates a slot in which ACK/NACK information for downlink data is transmitted.

Transmit power control (TPC) command for PUCCH: indicates a transmit power control command for the uplink control channel PUCCH.

In the case of physical uplink shared channel (PUSCH) transmission, time domain allocation may be transmitted by information on a slot in which a PUSCH is transmitted and the number of OFDM symbols L in which the starting OFDM symbol position S and the PUSCH in the corresponding slot are mapped. The above-described S may be a relative position from the start of the slot, L may be the number of consecutive OFDM symbols, and S and L may be determined from a start and length indicator value (SLIV) defined as follows.

If $(L-1) \leq 7$ then $SLIV = 14*(L-1)+S$ else $SLIV = 14*(14-L+1)+(14-1-S)$ where $0 < L \leq 14-S$ In a 5G or NR system, a terminal may be configured a table including SLIV, PUSCH mapping type, and information on a slot in which the PUSCH is transmitted in one row via RRC configuration. Thereafter, a base station may transmit the information on the SLIV, the PUSCH mapping type, and the slot through which the PUSCH is transmitted, by indicating the index value in the table configured in the time domain resource allocation of DCL. This method is also applied to PDSCH.

Specifically, in a case that a base station indicates to a terminal the time resource allocation field index m included in the DCI scheduling the PDSCH, this indicates the combination of demodulation reference signal (DMRS) type A position information corresponding to m+1, PDSCH mapping type information, slot index K0, data resource start symbol S, and data resource allocation length L in a table representing time domain resource allocation information. As an example, Table 3 below is a table including PDSCH time domain resource allocation information, based on a normal cyclic prefix.

TABLE 3

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |

TABLE 3-continued

| Row index | dmrs-TypeA-Position | PDSCH mapping type | K₀ | S | L |
|---|---|---|---|---|---|
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2,3 | Type B | 0 | 5 | 7 |
| 9 | 2,3 | Type B | 0 | 5 | 2 |
| 10 | 2,3 | Type B | 0 | 9 | 2 |
| 11 | 2,3 | Type B | 0 | 12 | 2 |
| 12 | 2,3 | Type A | 0 | 1 | 13 |
| 13 | 2,3 | Type A | 0 | 1 | 6 |
| 14 | 2,3 | Type A | 0 | 2 | 4 |
| 15 | 2,3 | Type B | 0 | 4 | 7 |
| 16 | 2,3 | Type B | 0 | 8 | 4 |

In Table 3, dmrs-typeA-Position is a field indicating the position of a symbol in which DMRS is transmitted in one slot indicated by a system information block (SIB), which is one of terminal common control information. The possible values for this field are 2 or 3. When the number of symbols constituting one slot is 14 and the first symbol index is 0, 2 means the third symbol and 3 means the fourth symbol. In Table 3, the PDSCH mapping type is information indicating the position of the DMRS in the scheduled data resource area. When the PDSCH mapping type is A, DMRS is always transmitted/received at a symbol position determined by dmrs-typeA-Position regardless of the allocated data time domain resource. When the PDSCH mapping type is B, DMRS is transmitted/received by DMRS in the first symbol among data time domain resources where the position is always allocated. In other words, PDSCH mapping type B does not use dmrs-typeA-Position information.

In Table 3, K0 denotes the offset of the slot index to which the PDCCH to which the DCI is transmitted belongs and the slot index to which the PDSCH or PUSCH scheduled in the DCI belongs. For example, when the slot index of the PDCCH is n, the slot index of the PDSCH or PUSCH scheduled by the DCI of the PDCCH is n+K0. In Table 3, S denotes the start symbol index of the data time domain resource within one slot. The range of possible S values is usually 0 to 13, based on normal cyclic prefix. In Table 3, L denotes a data time domain resource interval length within one slot. Possible values of L range from 1 to 14.

In a 5G or NR system, PUSCH mapping types are defined as type A and type B. In PUSCH mapping type A, the first OFDM symbol among DMRS OFDM symbols is located in the second or third OFDM symbol in the slot. In PUSCH mapping type B, the first OFDM symbol among DMRS OFDM symbols is located in the first OFDM symbol in the time domain resource allocated by PUSCH transmission. The aforementioned PUSCH time domain resource allocation method may be equally applicable to PDSCH time domain resource allocation.

DCI may be transmitted on a PDCCH (or control information, hereinafter the terms may be interchangeably used) which is a downlink physical control channel via channel coding and modulation. In general, DCI is scrambled independently with a specific radio network temporary identifier (RNTI) for each terminal and a cyclic redundancy check (CRC) is added and then, after channel coding, is configured and transmitted on each PDCCH. The PDCCH is transmitted by being mapped to a control resource set (CORESET) for the terminal.

The downlink data may be transmitted on a PDSCH that is a physical channel for downlink data transmission. The PDSCH may be transmitted after the control channel transmission period, and scheduling information such as a specific mapping position and modulation method in the frequency domain is determined based on DCI transmitted via the PDCCH.

Among the control information constituting the DCI, the base station notifies the terminal of the modulation method applied to the PDSCH to be transmitted and the size of the data (transport block size, TBS) to be transmitted, via an MCS. In one embodiment, the MCS may consist of 5 bits or more or fewer bits. TBS corresponds to the size before channel coding for error correction is applied to data to be transmitted by the base station.

In the disclosure, a transport block (TB) may include a MAC header, a MAC CE, one or more MAC Service Data Units (SDUs), and padding bits. Alternatively, TB may indicate a unit of data or a MAC protocol data unit (PDU) that is transmitted from the MAC layer to the physical layer.

The modulation schemes supported by the 5G or NR systems are QPSK, 16QAM, 64QAM, and 256QAM, and each modulation order (Qm) corresponds to 2, 4, 6, and 8. That is, 2 bits can be transmitted per symbol for QPSK modulation, 4 bits can be transmitted per OFDM symbol for 16QAM modulation, 6 bits can be transmitted per symbol for 64QAM modulation, and 8 bits can be transmitted per symbol for 256QAM modulation.

When the PDSCH is scheduled by the DCI, HARQ-ACK information indicating whether the PDSCH is successfully decoded or failed is transmitted from a terminal to a base station via PUCCH. The HARQ-ACK information is transmitted in the slot indicated by the PDSCH-to-HARQ feedback timing indicator included in the DCI scheduling the PDSCH, and values respectively mapped to PDSCH-to-HARQ feedback timing indicators of 1 to 3 bits are configured by the higher signal as in Table 4. When the PDSCH-to-HARQ feedback timing indicator indicates k, the terminal transmits HARQ-ACK information k slots after slot n where the PDSCH is transmitted, that is, in slot n+k.

TABLE 4

| PDSCH-to-HARQ_ feedback timing indicator | | | |
|---|---|---|---|
| 1 bit | 2 bits | 3 bits | Number of slots k |
| '0' | '00' | '000' | $1^{st}$ value provided by dl-DataToUL-ACK |
| '1' | '01' | '001' | $2^{nd}$ value provided by dl-DataToUL-ACK |
|  | '10' | '010' | $3^{rd}$ value provided by dl-DataToUL-ACK |
|  | '11' | '011' | $4^{th}$ value provided by dl-DataToUL-ACK |
|  |  | '100' | $5^{th}$ value provided by dl-DataToUL-ACK |
|  |  | '101' | $6^{th}$ value provided by dl-DataToUL-ACK |
|  |  | '110' | $7^{th}$ value provided by dl-DataToUL-ACK |
|  |  | '111' | $8^{th}$ value provided by dl-DataToUL-ACK |

When the PDSCH-to-HARQ feedback timing indicator is not included in DCI format 1_1 for scheduling the PDSCH, the terminal transmits HARQ-ACK information in slot n+k according to the k value configured as the higher signaling. When the terminal transmits HARQ-ACK information on the PUCCH, the terminal transmits the HARQ-ACK information to the base station using the PUCCH resource determined based on the PUCCH resource indicator included in the DCI scheduling the PDSCH. At this time, the ID of the PUCCH resource mapped to the PUCCH resource indicator may be configured via higher scheduling.

Figure 2:
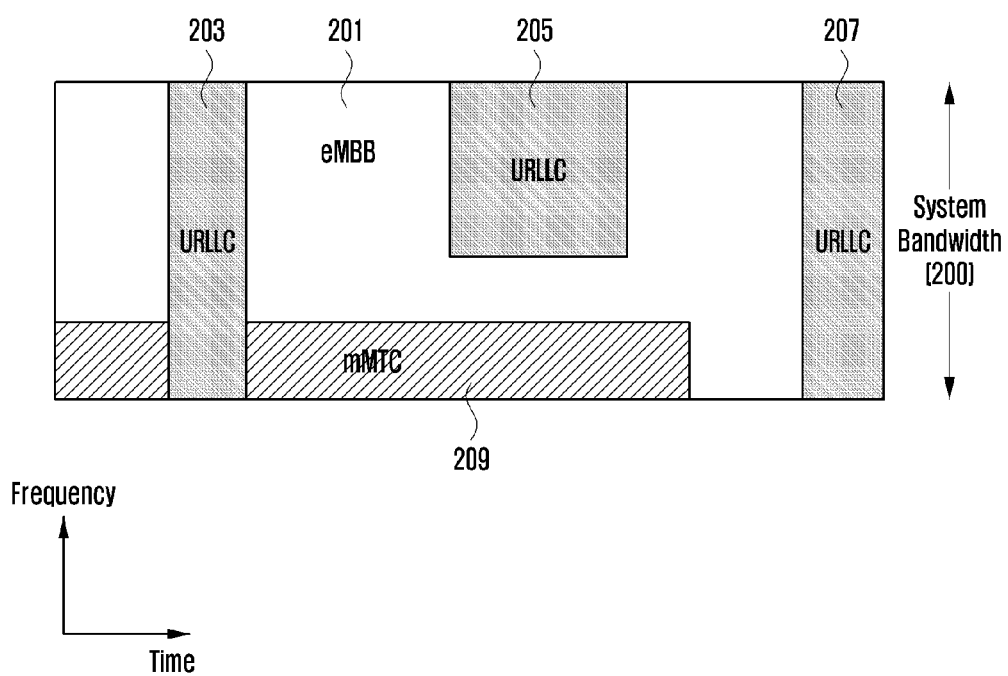
FIG. 2 is a view illustrating an example of allocating data for enhanced mobile broadband (eMBB), ultra-reliable and low-latency communications (URLLC), and mMTC in a time-frequency resource region in a 5G or NR system according to an embodiment of the disclosure.

FIG. 2 is a view illustrating an example of allocating data for eMBB, URLLC, and mMTC in a time-frequency resource region in a 5G or NR system according to an embodiment of the disclosure.

Referring to FIG. 2, data for eMVBB, URLLC, and nmMTC may be allocated in the entire system frequency band 200. In a case that URLLC data 203, 205, and 207 are generated and need to be transmitted while the eMBB data 201 and mMTC data 209 are allocated and transmitted in a specific frequency band, a transmitter may empty the portion where the eMBB data 201 and the mMTC data 209 are already allocated, or transmit URLLC data 203, 205 and 207 without transmitting. Among the above-described services, since URLLC needs reduced latency, URLLC data may be allocated and transmitted to a portion of a resource to which eMBB or mMTC data is allocated. When URLLC data is additionally allocated and transmitted from a resource to which eMBB data is allocated, eMBB data may not be transmitted from overlapping time-frequency resources, and thus transmission performance of eMBB data may be lowered. That is, eMBB data transmission failure due to URLLC allocation may occur.

Figure 3:
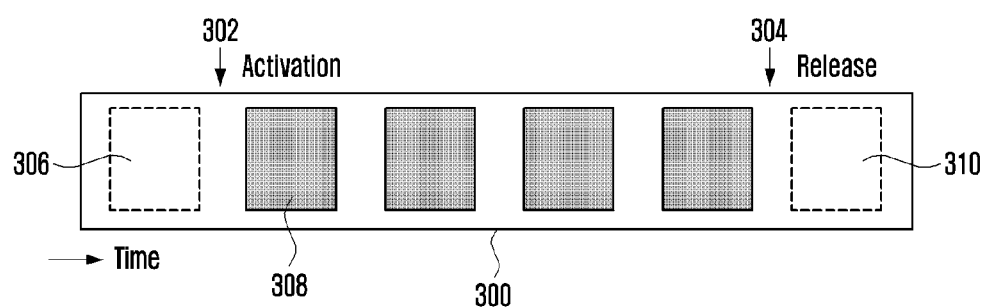
FIG. 3 is a view illustrating a grant-free transmission and reception operation according to an embodiment of the disclosure.

FIG. 3 is a view illustrating a grant-free transmission and reception operation according to an embodiment of the disclosure.

A terminal has a first signal transmission/reception type that performs downlink data reception according to information configured as only a higher signal from a base station, and a second signal transmission/reception type that performs downlink data reception according to transmission configuration information indicated by the higher signal and L1 signal. In the disclosure, SPS, which is a second signal type for receiving downlink data, means grant-free (non-approval) based PDSCH transmission in downlink. The DL SPS may allow the terminal to receive the non-approval-based PDSCH transmission via higher signal configuration and additional configuration information indicated by DCI.

DL SPS means downlink semi-persistent scheduling, and is a method in which a base station periodically transmits and receives downlink data information, based on information configured as higher signaling without scheduling specific downlink control information to a terminal. The DL SPS can be applied in voice over internet protocol (VoIP) or periodically generated traffic conditions. Alternatively, the resource configuration for DL SPS is periodic, but the actually generated data may be aperiodic. In this case, since the terminal does not know whether actual data is generated from the periodically configured resource, it may be possible to perform the following two types of operations.

Method 3-1: For a periodically configured DL SPS resource region, the terminal transmits HARQ-ACK information to a base station for an uplink resource region corresponding to the resource region for demodulation/decoding results for received data.

Method 3-2: For a periodically configured DL SPS resource region, when a terminal successfully detects at least DMRS or data, HARQ-ACK information is transmitted to a base station for an uplink resource region corresponding to a corresponding resource region for demodulation/decoding results for the received data.

Method 3-3: For a periodically configured DL SPS resource region, when a terminal succeeds in decoding/demodulation (i.e., ACK occurs), HARQ-ACK information is transmitted to a base station for an uplink resource region corresponding to a corresponding resource region for demodulation/decoding results for the received data.

In method 3-1, even if the actual base station does not transmit downlink data for the DL SPS resource region, the terminal always transmits HARQ-ACK information to the uplink resource region corresponding to the DL SPS resource region. In method 3-2, since the base station does not know when to transmit data to the DL SPS resource region, it may be possible to transmit HARQ-ACK information in a situation where the terminal knows whether to transmit or receive data, such as successful DMRS detection or successful CRC detection. In method 3-3, HARQ-ACK information is transmitted to an uplink resource region corresponding to the DL SPS resource region only when the terminal successfully demodulates/decodes data.

The terminal may always support only one of the above-described methods or may support two or more. It may be possible to select one of the above methods as a 3GPP standard or higher signal. For example, when the method 3-1 is indicated as the higher signal, the terminal may be able to perform HARQ-ACK information for the corresponding DL SPS, based on the method 3-1. Alternatively, one method may be selected according to DL SPS higher configuration information. For example, for the DL SPS higher configuration information, when the transmission period is n slots or more, the terminal applies method 3-1, and when the transmission period is less than n slots, the terminal may apply method 3-3. In this example, the transmission period is given as an example, but it may be possible to sufficiently apply the applied MCS table, DMRS configuration information, resource configuration information, and the like.

The terminal performs downlink data reception in a downlink resource region configured as higher signaling. It may be possible to perform activation or release of a downlink resource region configured as the higher signaling as L1 signaling.

FIG. 3 illustrates the operation for the DL SPS. The terminal configures the next DL SPS configuration information from the higher signal.

Periodicity: DL SPS transmission period nrofHARQ-processes: Number of HARQ processes set for DL SPS n1PUCCH-AN: HARQ resource configuration information for DL SPS mcs-table: MCS table configuration information applied to DL SPS In the disclosure, all DL SPS configuration information may be configured for each primary cell (Pcell) or secondary cell (Scell), and may also be configured for each BWP. In addition, it may be possible to be configured one or more DL SPSs for each particular cell and for each BWP.

Referring to FIG. 3, the terminal determines grant-free transmission/reception configuration information 300 via receiving a higher signal for DL SPS. The DL SPS may transmit/receive data to/from the resource region 308 configured after receiving (302) the DCI indicating activation, and cannot transmit/receive data to/from the resource region 306 before receiving the DCI. In addition, the terminal cannot receive data for the resource region 310 after receiving the DCI indicating the release (304).

The terminal validates the DL SPS allocation PDCCH when the following two conditions are satisfied for SPS scheduling activation or release.

Condition 1: When the CRC bit of the DCI format transmitted in the PDCCH is scrambled with configured scheduling (CS)-RNTI configured as higher signaling.

Condition 2: When the new data indicator (NDI) field for the activated transport block is configured as 0.

When some of the fields constituting the DCI format transmitted to the DL SPS assignment PDCCH are the same as those shown in the following Table 5 or Table 6, the terminal determines that the information in the DCI format is a valid activation of DL SPS or a valid release. As an example, when the terminal detects the DCI format including the information presented in Table 5, the terminal determines that the DL SPS is activated. As another example, when the terminal detects the DCI format including the information shown in Table 6, the terminal determines that the DL SPS has been released.

If some of the fields constituting the DCI format transmitted on the DL SPS assignment PDCCH are not the same as those shown in Table 5 (special field configuration information for activating DL SPS) or Table 6 (special field configuration information for releasing DL SPS), the terminal determines that the DCI format is detected as a CRC that does not match.

TABLE 5

|  | DCI format 1_0 | DCI format 1_1 |
| --- | --- | --- |
| HARQ process number | set to all '0's | set to all '0's |
| Redundancy version | set to '00' | For the enabled transport block: set to '00' |

TABLE 6

|  | DCI format 1_0 |
| --- | --- |
| HARQ process number | set to all '0's |
| Redundancy version | set to '00' |
| Modulation and coding scheme | set to all '1's |
| Resource block assignment | set to all '1's |

When the terminal receives the PDSCH without receiving the PDCCH or the PDCCH indicating the SPS PDSCH release, the terminal generates the HARQ-ACK information bit corresponding thereto. Also, in at least Rel-15 NR, the terminal does not expect to transmit HARQ-ACK information (s) for receiving two or more SPS PDSCHs on one PUCCH resource. In other words, in at least Rel-15 NR, the terminal includes only HARQ-ACK information for receiving one SPS PDSCH in one PUCCH resource.

The DL SPS can also be configured in a PCell and an SCell. The parameters that can be configured as DL SPS higher signaling are as follows.

Periodicity: DL SPS transmission period nrofHARQ-processes: The number of HARQ processes that can be configured for DL SPS n1PUCCH-AN: PUCCH HARQ resource for DL SPS, base station configures resources in PUCCH format 0 or 1

Table 5 to Table 6 described above will be possible fields in a situation where only one DL SPS can be configured for each cell or for each BWP. The DCI field for activating (or releasing) each DL SPS resource in a situation in which multiple DL SPSs are configured for each cell and for each BWP may vary. The disclosure provides a method for solving such a situation.

In the disclosure, not all DCI formats described in Table 5 and Table 6 are used to activate or release DL SPS resources, respectively. For example, DCI format 1_0 and DCI format 1_1 used for scheduling PDSCH may be used for activating DL SPS resources. For example, DCI format 1_0 used to schedule the PDSCH may be used for releasing DL SPS resources.

Figure 4:
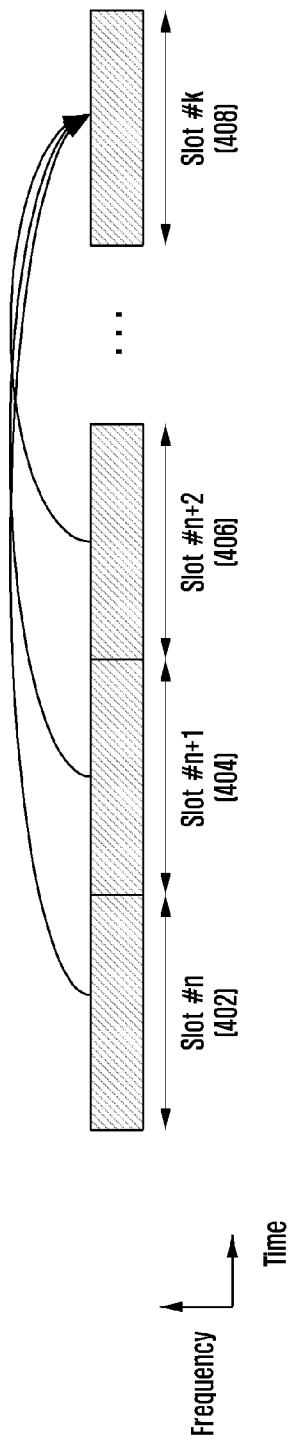
FIG. 4 is a view illustrating a semi-static hybrid automatic repeat request (HARQ)-acknowledgement (ACK) codebook configuration method in an NR system according to an embodiment of the disclosure.

FIG. 4 is a view illustrating a semi-static hybrid automatic repeat request (HARQ)-acknowledgement (ACK) codebook configuration method in an NR system according to an embodiment of the disclosure.

In a situation where the HARQ-ACK PUCCH that a terminal can transmit within one slot is limited to one, when the terminal receives a semi-static HARQ-ACK codebook higher configuration, the terminal reports HARQ-ACK information for PDSCH reception or SPS PDSCH release in the HARQ-ACK codebook in the slot indicated by the value of the PDSCH-to-HARQ_feedback timing indicator in DCI format 1_0 or DCI format 1_1. The terminal reports the value of the HARQ-ACK information bit in the HARQ-ACK codebook as a NACK in a slot not indicated by the PDSCH-to-HARQ_feedback timing indicator field in DCI format 1_0 or DCI format 1_1. If the terminal reports only one SPS PDSCH release or HARQ-ACK information for one PDSCH reception in $M_{A, C}$ cases for candidate PDSCH reception, and the report is scheduled by DCI format 1_0 including information indicating that the counter DAI field is 1 in the Pcell, the terminal determines one SPQ PDSCH release or one HARQ-ACK codebook for receiving the PDSCH.

Otherwise, the HARQ-ACK codebook determination method according to the above-described method is followed.

Assuming that the set of PDSCH reception candidate cases in the serving cell c is $M_{A, c}$, $M_{A, c}$ can be obtained in the following [pseudo-code 1] operations.

[Start Pseudo-Code 1]

Operation 1: Initialize j to 0 and $M_{A, c}$ to the empty set. Initialize k, which is a HARQ-ACK transmission timing index, to 0.

Operation 2: Configure R as a set of each row in a table including slot information to which a PDSCH is mapped, start symbol information, number of symbols, or length information. If the PDSCH-capable mapping symbol indicated by each value of R is configured as the UL symbol according to the DL and UL configurations configured in the higher layer, the corresponding row is deleted from R.

Operation3-1: The terminal can receive one PDSCH for unicast in one slot, and if R is not empty, one is added to the set $M_{A, c}$.

Operation 3-2: If the terminal can receive more than one PDSCH for unicast in one slot, the number of PDSCHs that can be allocated to different symbols in the calculated R is counted and the corresponding number is added to $M_{A, c}$.

Operation 4: Start again from operation 2 by increasing k by 1.

[End Pseudo-Code 1]

Referring to FIG. 4, taking the above pseudo-code 1 as an example of FIG. 4, in order to perform HARQ-ACK PUCCH transmission in slot #k 408, all slot candidates capable of PDSCH-to-HARQ-ACK timing capable of indicating slot #k 408 are considered. In FIG. 4, it is assumed that HARQ-ACK transmission is possible in slot #k 408 by a combination of PDSCH-to-HARQ-ACK timings at which only PDSCHs scheduled in slot #n (402), slot #n+1 (404)

and slot #n+2 (406) are possible. In addition, the maximum number of PDSCHs that can be scheduled for each slot is derived in consideration of information indicating whether a symbol in a slot is a downlink or an uplink in time slot resource configuration information of a PDSCH that can be scheduled in slots 402, 404, and 406, respectively. For example, when the maximum scheduling is possible for 2 PDSCHs in slot 402, 3 PDSCHs in slot 404, and 2 PDSCHs in slot 406, the maximum number of PDSCHs included in the HARQ-ACK codebook transmitted in slot 408 is seven in total. This is called the cardinality of the HARQ-ACK codebook.

Operation 3-2 in a specific slot is described through the following Table 7 (default PDSCH time domain resource allocation A for normal CP).

TABLE 7

| Row index | dmrs-TypeA-Position | PDSCH mapping type | $K_0$ | S | L | Ending | Order |
|---|---|---|---|---|---|---|---|
| 1 | 2 | Type A | 0 | 2 | 12 | 13 | 1x |
|  | 3 | Type A | 0 | 3 | 11 | 13 | 1x |
| 2 | 2 | Type A | 0 | 2 | 10 | 11 | 1x |
|  | 3 | Type A | 0 | 3 | 9 | 11 | 1x |
| 3 | 2 | Type A | 0 | 2 | 9 | 10 | 1x |
|  | 3 | Type A | 0 | 3 | 8 | 10 | 1x |
| 4 | 2 | Type A | 0 | 2 | 7 | 8 | 1x |
|  | 3 | Type A | 0 | 3 | 6 | 8 | 1x |
| 5 | 2 | Type A | 0 | 2 | 5 | 6 | 1x |
|  | 3 | Type A | 0 | 3 | 4 | 6 | 1x |
| 6 | 2 | Type B | 0 | 9 | 4 | 12 | 2x |
|  | 3 | Type B | 0 | 10 | 4 | 13 | 3 |
| 7 | 2 | Type B | 0 | 4 | 4 | 7 | 1x |
|  | 3 | Type B | 0 | 6 | 4 | 9 | 2 |
| 8 | 2, 3 | Type B | 0 | 5 | 7 | 11 | 1x |
| 9 | 2, 3 | Type B | 0 | 5 | 2 | 6 | 1x |
| 10 | 2, 3 | Type B | 0 | 9 | 2 | 10 | 2x |
| 11 | 2, 3 | Type B | 0 | 12 | 2 | 13 | 3x |
| 12 | 2, 3 | Type A | 0 | 1 | 13 | 13 | 1x |
| 13 | 2, 3 | Type A | 0 | 1 | 6 | 6 | 1x |
| 14 | 2, 3 | Type A | 0 | 2 | 4 | 5 | 1 |
| 15 | 2, 3 | Type B | 0 | 4 | 7 | 10 | 1x |
| 16 | 2, 3 | Type B | 0 | 8 | 4 | 11 | 2x |

Table 7 is a time resource allocation table in which the terminal operates by default before the terminal receives time resource allocation as a separate RRC signal. For reference, in addition to indicating the row index value separately in RRC, the PDSCH time resource allocation value is determined by dmrs-TypeA-Position, which is a common RRC signal of the terminal. In Table 7, the Ending column and the Order column are values separately added for convenience of description, and it may be possible that they do not actually exist. The Ending column shows the end symbol of the scheduled PDSCH, and the Order column shows the code position value located in a specific codebook in the semi-static HARQ-ACK codebook. This table applies to time resource allocation applied in DCI format 1_0 of the common search area of PDCCH.

The terminal performs the following operations to determine the HARQ-ACK codebook by calculating the maximum number of non-overlapping PDSCHs within a specific slot.

Operation 1: Among all the rows in the PDSCH time resource allocation table, the PDSCH allocation value that ends first in the slot is searched for. Table 7 shows that the row index 14 ends first. This is indicated as 1 in the Order column. Also, other row indexes overlapping the corresponding row index 14 and at least one symbol are marked as 1× in the Order column.

Operation 2: Then, the PDSCH allocation value that ends first among the remaining row indexes not displayed in the Order column is searched for. In Table 7, the row index is 7 and the dmrs-TypeA-Position value is 3. Also, other row indexes overlapping the corresponding row index and at least one symbol are marked as 2× in the Order column.

Operation 3: Repeat operation 2 and increase to display the order value. For example, in Table 7, a PDSCH allocation value that ends first among row indexes not displayed in the Order column is searched for. In Table 7, the row index is 6 and the dmrs-TypeA-Position value is 3. Also, other row indexes overlapping the corresponding row index and at least one symbol are marked as 3× in the Order column.

Operation 4: When the order is displayed in all row indexes, the process is ended. Also, the size of the corresponding order is the maximum number of PDSCHs that can be scheduled without overlapping time in the corresponding slot. Scheduling without time overlapping means that different PDSCHs are scheduled by a TDM.

In the order column of Table 7, the maximum value of order means the HARQ-ACK codebook size of the corresponding slot, and the order value means the HARQ-ACK codebook point where the HARQ-ACK feedback bit for the scheduled PDSCH is located. For example, row index 16 of Table 7 means that it exists at the second code position in the semi-static HARQ-ACK codebook of size 3. When the terminal transmitting the HARQ-ACK feedback is a set of PDSCH reception candidate cases in the serving cell c as $M_{A,c}$ (occasion for candidates PDSCH receptions), it is possible to obtain $M_{A,c}$ in [pseudo-code 1] or [pseudo-code 2] operations. $M_{A,c}$ may be used to determine the number of HARQ-ACK bits to be transmitted by the terminal. Specifically, the HARQ-ACK codebook may be configured using the cardinality of the $M_{A,c}$ sets.

As another example, considerations for determining a semi-static HARQ-ACK codebook (or type 1 HARQ-ACK codebook) may be as follows.

a) On a set of slot timing values $K_1$ associated with the active UL BWP
  a) If the UE is configured to monitor PDCCH for DCI format 1_0 and is not configured to monitor PDCCH for DCI format 1_1 on serving cell c, $K_1$ is provided by the slot timing values {1, 2, 3, 4, 5, 6, 7, 8} for DCI format 1_0
  b) If the UE is configured to monitor PDCCH for DCI format 1_1 for serving cell c, $K_1$ is provided by dl-DataToUL-ACK for DCI format 1_1
b) On a set of row indexes R of a table that is provided either by a first set of row indexes of a table that is provided by PDSCH-TimeDomainResourceAllocationList in PDSCH-ConfigCommon, by Default PDSCH time domain resource allocation A [6, TS 38.214], or by the union of the first set of row indexes and a second set of row indexes, if provided by PDSCH-TimeDomainResourceAllocationList in PDSCH-Config, associated with the active DL BWP and defining respective sets of slot offsets $K_0$, start and length indicators SLIV, and PDSCH mapping types for PDSCH reception as described in [6, TS 38.214]
c) On the ratio $2^{\mu_{DL}-\mu_{UL}}$ between the downlink SCS configuration $\mu^{DL}$ and the uplink SCS configuration $\mu^{UL}$ provided by subcarrierSpacing in BWP-Downlink and BWP-Uplink for the active DL BWP and the active UL BWP, respectively d) If provided, on TDD-UL-DL-ConfigurationCommon and TDD-UL-DL-ConfigDedicated as described in Subclause 11.1.

As another example, the pseudo-code for HARQ-ACK codebook determination may be as follows.
[Start Pseudo-Code 2]
For the set of slot timing values $K_1$, the UE determines a set of $M_{A,c}$ occasions for candidate PDSCH receptions or SPS PDSCH releases according to the following pseudo-code. A position in the Type-1 HARQ-ACK codebook for HARQ-ACK information corresponding to a SPS PDSCH release is the same as for a corresponding SPS PDSCH reception.

Set j=0—index of occasion for candidate PDSCH reception or SPS PDSCH release
Set B=Ø
Set $M_{A,c}$=Ø
Set $c(K_1)$ to the cardinality of set $K_1$
Set k=0—index of slot timing values $K_{1,k}$, in descending order of the slot timing values, in set $K_1$ or serving cell c
while $k<c(K_1)$
if $\mod(n_U-K_{1,k}+1, \max(2^{\mu_{DL}-\mu_{UL}}, 1))=0$
Set $n_D$=0—index of a DL slot within an UL slot
while $n_D<\max(2^{\mu_{DL}-\mu_{UL}}, 1)$
Set R to the set of rows
Set c(R) to the cardinality of R
Set r=0—index of row in set R
if slot $n_U$ starts at the same time as or after a slot for an active DL BWP change on serving cell c or an active UL BWP change on the PCell and slot $\lfloor(n_U-K_{1,k})*2^{\mu_{DL}-\mu_{UL}}\rfloor+n_D$ is before the slot for the active DL BWP change on serving cell c or the active UL BWP change on the PCell
continue;
else
while $r<c(R)$
if the terminal is provided TDD-UL-DL-ConfigurationCommon or TDD-UL-DL-ConfigDedicated and, for each slot from slot $\lfloor(n_U-K_{1,k})*2^{\mu_{DL}-\mu_{UL}}\rfloor+n_D-N_{PDSCH}^{repeat}+1$ to slot $\lfloor(n_U-K_{1,k})*2^{\mu_{DL}-\mu_{UL}}\rfloor+n_D$, at least one symbol of the PDSCH time resource derived by row r is configured as UL where $K_{1,k}$ is the k-th slot timing value in set $K_1$,
R=R/r;
end if
r=r+1;
end while
if the terminal does not indicate a capability to receive more than one unicast PDSCH per slot and R≠Ø,
$M_{A,c}=M_{A,c}\cup j$;
j=j+1;
The UE does not expect to receive SPS PDSCH release and unicast PDSCH in a same slot;
else
Set c(R) to the cardinality of R
Set m to the smallest last OFDM symbol index, as determined by the SLIV, among all rows of R
while R≠Ø
Set r=0
while $r<c(R)$
if S≤m for start OFDM symbol index S for row r
$b_{r,k,n_D}$=j; —index of occasion for candidate PDSCH reception or SPS PDSCH release associated with row r
R=R/r;
$B=B\cup b_{r,k,n_D}$;
end if r=r+1;
end while
$M_{A,c}=M_{A,c}\cup j$
j=j+1;
Set m to the smallest last OFDM symbol index among all rows of R;

```
            end while
          end if
        end if
        n_D=n_D+1;
      end while
    end if
    k=k+1;
  end while
```

[End Pseudo-Code 2]

The position of the HARQ-ACK codebook containing the HARQ-ACK information for DCI indicating the DL SPS release in pseudo-code 2 is based on the position where the DL SPS PDSCH is received. For example, if the start symbol for transmitting the DL SPS PDSCH starts from the 4th OFDM symbol based on the slot and has a length of 5 symbols, it is assumed that the HARQ-ACK information including the DL SPS release indicating the release of the corresponding SPS starts from the 4th OFDM symbol of the slot in which the DL SPS release is transmitted, a PDSCH with a length of 5 symbols is mapped, and the corresponding HARQ-ACK information is determined via the PDSCH-to-HARQ-ACK timing indicator and PUSCH resource indicator included in the control information indicating the DL SPS release. As another example, when the start symbol for transmitting DL SPS PDSCH starts from the 4th OFDM symbol on a slot basis and has a length of 5 symbols, it is assumed that the HARQ-ACK information including the DL SPS release indicating the release of the corresponding SPS starts from the 4th OFDM symbol of the slot indicated by the time domain resource allocation (TDRA) of the DCI, which is the DL SPS release, the PDSCH with a length of 5 symbols is mapped, and the corresponding HARQ-ACK information is determined through the PDSCH-to-HARQ-ACK timing indicator and PUSCH resource indicator included in the control information indicating the DL SPS release.

Figure 5:
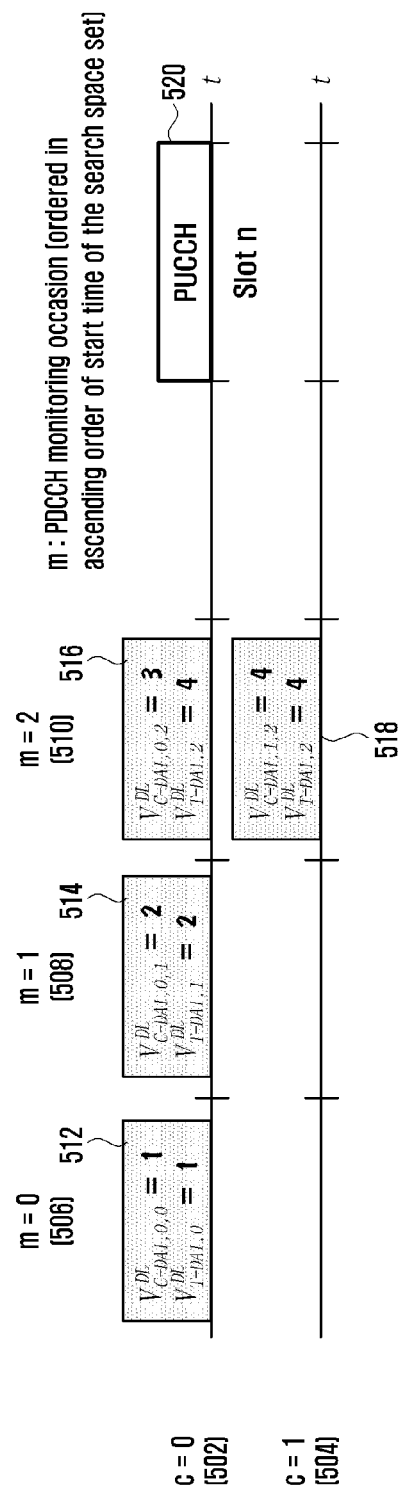
FIG. 5 is a view illustrating a method of configuring a dynamic HARQ-ACK codebook in an NR system according to an embodiment of the disclosure.

FIG. 5 is a view illustrating a method of configuring a dynamic HARQ-ACK codebook in an NR system according to an embodiment of the disclosure.

A terminal transmits HARQ-ACK information transmitted in one PUCCH in the corresponding slot n, based on PDSCH-to-HARQ_feedback timing value for PUCCH transmission of HARQ-ACK information in slot n for PDSCH reception or SPS PDSCH release and K0, which is PDSCH transmission slot position information scheduled in DCI format 1_0 or 1_1. Specifically, in order to transmit the above-described HARQ-ACK information, the terminal determines the HARQ-ACK codebook of the PUCCH transmitted in the slot determined by PDSCH-to-HARQ_feedback timing and K0, based on the DAI included in the DCI indicating the PDSCH or SPS PDSCH release.

The DAI is composed of Counter DAI and Total DAI. The Counter DAI is information in which HARQ-ACK information corresponding to a PDSCH scheduled in DCI format 1_0 or DCI format 1_1 indicates the position in the HARQ-ACK codebook. Specifically, the value of the Counter DAI in DCI format 1_0 or 1_1 indicates the cumulative value of PDSCH reception or SPS PDSCH release scheduled by DCI format 1_0 or DCI format 1_1 in a specific cell c. The cumulative value is configured based on the PDCCH monitoring occasion and the serving cell in which the scheduled DCI is present.

The Total DAI is a value indicating the size of the HARQ-ACK codebook. Specifically, the value of Total DAI means the total number of previously scheduled PDSCH or SPS PDSCH releases, including when the DCI was scheduled. The Total DAI is a parameter used when the HARQ-ACK information in the serving cell c in the carrier aggregation (CA) situation also includes HARQ-ACK information for the PDSCH scheduled in another cell including the serving cell c. In other words, there is no Total DAI parameter in a system operating with one cell.

Referring to FIG. 5, an example of an operation for the DAI is shown. FIG. 5, shows the change in the values of Counter DAI (C-DAI) and Total DAI (T-DAI) indicated by DCI discovered for each PDCCH monitoring occasion configured for each carrier, when the terminal transmits the HARQ-ACK codebook selected based on the DAI in the nth slot of the carrier 0 502 to the PUCCH 520 in a situation where two carriers are configured. First, in the DCI found at m=0 506, C-DAI and T-DAI indicate values of 1 (512), respectively. In the DCI found at m=1 (508), C-DAI and T-DAI indicate values of 2 (514), respectively. In the DCI found for carrier 0 (c=0, 502) of m=2 510, C-DAI indicates value of 3 (516). In the DCI found for carrier 1 (c=1, 504) of m=2 (510), C-DAI indicates a value of 4 (518). At this time, when carriers 0 and 1 are scheduled in the same monitoring occasion, T-DAI is all indicated as 4.

The HARQ-ACK codebook determination in FIGS. 4 and 5 is operated in a situation in which only one PUCCH containing HARQ-ACK information is transmitted in one slot. This is called mode 1. As an example of a method in which one PUCCH transmission resource is determined in one slot, when the PDSCHs scheduled in different DCIs are multiplexed and transmitted in one HARQ-ACK codebook in the same slot, the PUCCH resource selected for HARQ-ACK transmission is determined as the PUCCH resource indicated by the PUCCH resource field indicated in the DCI that last scheduled the PDSCH. That is, the PUCCH resource indicated by the PUCCH resource field indicated in the DCI scheduled before the DCI is ignored.

The following description defines HARQ-ACK codebook determination methods and devices in a situation in which two or more PUCCHs containing HARQ-ACK information can be transmitted in one slot. This is called mode 2. The terminal may be able to operate only in mode 1 (transmit only one HARQ-ACK PUCCH in one slot) or in mode 2 (transmit one or more HARQ-ACK PUCCH in one slot). Alternatively, a terminal supporting both mode 1 and mode 2 is configured such that the base station operates only in one mode by higher signaling, or mode 1 and mode 2 may be implicitly determined by DCI format, RNTI, DCI specific field value, scrambling, etc. For example, PDSCH scheduled in DCI format A and HARQ-ACK information associated therewith are based on mode 1, and PDSCH scheduled in DCI format B and HARQ-ACK information associated therewith are based on mode 2.

Whether the above-described HARQ-ACK codebook is semi-static in FIG. 4 or dynamic in FIG. 5 is determined by the RRC signal.

Figure 6:
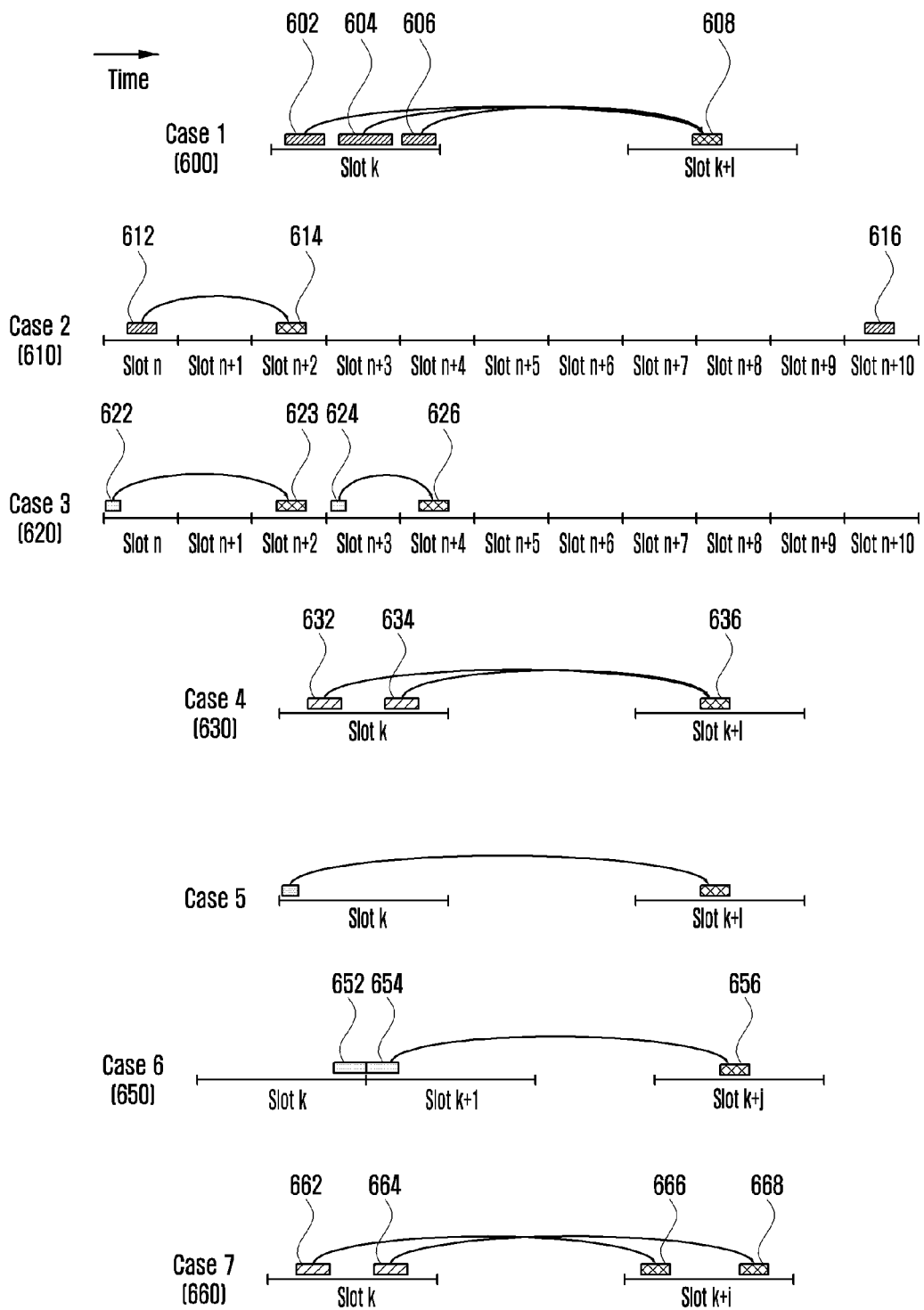
FIG. 6 is a view illustrating an HARQ-ACK transmission process for downlink (DL) semi persistent scheduling (SPS) according to an embodiment of the disclosure.

FIG. 6 is a view illustrating an HARQ-ACK transmission process for DL SPS according to an embodiment of the disclosure.

Referring to FIG. 6, case 1 (600) shows a situation in which the maximum number of PDSCHs 602, 604 and 606 that can be received is mapped without overlapping in terms of time resources in slot k. For example, if the PDSCH-to-HARQ feedback timing indicator is not included in the DCI format for scheduling the PDSCH, the terminal transmits HARQ-ACK information 608 in the slot k+1 according to the value of 1 configured for higher signaling of HARQ-ACK information. Therefore, the size of the semi-static HARQ-ACK codebook in slot k+1 is equal to the maximum number of PDSCHs that can be transmitted in slot k, and will be 3. In addition, if the HARQ-ACK information for each PDSCH is 1 bit, the HARQ-ACK codebook of reference numerals 600 to 608 of FIG. 6 will be composed of a total of 3 bits of [X, Y, Z], and X will be HARQ-ACK information for PDSCH 602, Y will be HARQ-ACK information for PDSCH 604, and Z will be HARQ-ACK information for PDSCH 606. If PDSCH reception is successful, the corresponding information will be mapped to ACK, otherwise the corresponding information will be mapped to NACK. In addition, if the actual DCI does not schedule the corresponding PDSCH, the terminal reports as NACK. Specifically, the position of the HARQ-ACK codebook located according to SLIV of the PDSCH that can be scheduled in DCI may vary, and may be determined by Table 7, [pseudo code 1], or [pseudo code 2].

Case 2 (610) of FIG. 6 shows HARQ-ACK transmission in a situation where DL SPS is activated. In Rel-15 NR, the minimum period of DL SPS is 10 ms, and the length of one slot is 1 ms in a 15 kHz subcarrier interval in case 2 (610), so that SPS PDSCH 612 will be transmitted in slot n, and then SPS PDSCH 616 will be transmitted in slot n+10.

HARQ-ACK information for each SPS PDSCH indicates frequency resources, time resources, MCS values, and the like according to information included in a DCI format indicating activation of a corresponding SPS, after reporting the period for the SPS, the HARQ-ACK transmission resource information, MCS table configuration, and the number of HARQ processes as a higher signal. For reference, the PUCCH resource to which the HARQ-ACK information is transmitted can also be configured as a higher signal, and the PUCCH resource has the following attributes.

Existence of Hopping

PUCCH Format (Start Symbol, Symbol Length, Etc.)

Here, the MCS table configuration and the HARQ-ACK transmission resource information may not exist. When the HARQ-ACK transmission resource information is present, Rel-15 NR supports PUCCH format 0 or 1 that can transmit up to 2 bits. However, in future releases, PUCCH format 2, 3, or 4 of 2 bits or more can be fully supported.

Since the HARQ-ACK transmission resource information is included in the DL SPS higher signal configuration, the terminal may ignore the PUCCH resource indicator in the DCI format indicating DL SPS activation. Alternatively, the PUCCH resource indicator field itself may not be present in the corresponding DCI format. On the other hand, if there is no HARQ-ACK transmission resource information in the DL SPS higher signal configuration, the terminal transmits HARQ-ACK information corresponding to the DL SPS to the PUCCH resource determined in the PUCCH resource indicator of the DCI format that activates the DL SPS. In addition, the difference between the slot in which the SPS PDSCH is transmitted and the slot in which the corresponding HARQ-ACK information is transmitted is determined by the value indicated in the PDSCH to HARQ-ACK feedback timing indicator of the DCI format that activates DL SPS or it follows a specific value configured in advance as the higher signal if the indicator does not exist. For example, as in case 2 (610) of FIG. 6, if the PDSCH to HARQ-ACK feedback timing indicator is 2, the HARQ-ACK information for the SPS PDSCH 612 transmitted in slot n is transmitted through the PUCCH 614 in slot n+2. In addition, the PUCCH to which the corresponding HARQ-ACK information is transmitted may be configured as a higher signal or a corresponding resource may be determined by an L1 signal indicating DL SPS activation. If it is assumed that up to three PDSCHs can be received as the reference numeral 600 of FIG. 6 and the time resource of PDSCH 612 is the same as PDSCH 604, the position of the HARQ-ACK codebook for the SPS PDSCH 612 transmitted to the PUCCH 614 is located in the Y-th of [X Y Z].

If a DCI indicating DL SPS release is transmitted, the terminal should transmit HARQ-ACK information for the DCI to the base station. However, in the case of a quasi-static HARQ-ACK codebook, the size and position of the HARQ-ACK codebook are determined by a time resource region to which the PDSCH is allocated and a slot interval (PDSCH to HARQ-ACK feedback timing) between the PDSCH and the HARQ-ACK indicated by the L1 signal or the higher signal, as described above in the disclosure. Therefore, when the DCI indicating the DL SPS release is transmitted to the semi-static HARQ-ACK codebook, a specific rule is required rather than arbitrarily determining the position in the HARQ-ACK codebook, and in Rel-15 NR, the position of HARQ-ACK information for DCI indicating DL SPS release is mapped in the same manner as the transmission resource region of the corresponding DL SPS PDSCH. As an example, case 3 (620) of FIG. 6 shows a situation in which DCI 622 indicating the release of the activated DL SPS PDSCH is transmitted in slot n. When the PDSCH to HARQ-ACK feedback timing indicator included in the DCI 622 format indicates 2, HARQ-ACK information for the DCI 622 will be transmitted to the PUCCH 623 of slot n+2. The position of the HARQ-ACK codebook is assumed that the predetermined SPS PDSCH is scheduled in slot n, and the terminal maps and transmits HARQ-ACK information for the DCI 622 indicating DL SPS release in the HARQ-ACK codebook position corresponding to the SPS PDSCH. In this regard, the following two methods are possible, and the base station and the terminal will transmit and receive the corresponding DCI in at least one method according to a standard or a base station configuration.

Method 6-1-1: DCI transmission indicating to release the DL SPS only in the slot in which the preset SPS PDSCH is to be transmitted.

For example, as in case 3 (620) of FIG. 6, if the SPS PDSCH is configured to be transmitted in slot n, the terminal transmits the DCI 622 indicating SPS PDSCH release only in slot n, and HARQ-ACK information for the same. The position of the slot in which HARQ-ACK information is transmitted is the same as the position of the determined slot, assuming that the SPS PDSCH is transmitted. In other words, when the slot in which HARQ-ACK information for SPS PDSCH is transmitted is n+2, the slot in which HARQ-ACK information for the DCI indicating DL SPS PDSCH release is transmitted is also n+2.

Method 6-1-2: Regardless of the slot in which the SPS PDSCH is transmitted, the DCI indicating DL SPS release in an arbitrary slot is transmitted.

For example, as in case 3 (620) of FIG. 6, assuming that the SPS PDSCH is transmitted in slots n, n+10, n+20, . . . , the base station transmits DCI 624 indicating the DL SPS PDSCH release in slot n+3, and when the value indicated in the PDSCH to HARQ-ACK feedback timing indicator included in the DCI is 1 or there is no corresponding field, HARQ-ACK information 626 for DCI indicating DL SPS PDSCH release is transmitted/received in slot n+4 when the value previously configured as a higher signal is 1.

There may be cases where the minimum period of DL SPS becomes shorter than 10 ms. For example, if different equipment in a factory have data requiring high reliability and low latency over the air, and the transmission period of the corresponding data is constant and the period itself is short, it?? should be shorter than 10 ms. Accordingly, the DL SPS transmission period may be determined in slot units, symbol units, or symbol group units, regardless of subcarrier intervals, not ms units. For reference, the minimum transmission period of the uplink configured grant PUSCH resource is 2 symbols.

The case 4 (630) of FIG. 6 shows a situation in which the transmission period of a DL SPS is 7 symbols, which is smaller than slot k. Since the transmission period is within one slot, up to two SPS PDSCHs 632 and 634 can be transmitted in slot k. In addition, if the HARQ-ACK information corresponding to the SPS PDSCH 632 and the SPS PDSCH 634 does not have a value indicated by the PDSCH to HARQ-ACK feedback timing indicator included in the DCI indicating SPS activation or a corresponding field, HARQ-ACK information is transmitted in the slot according to the value configured in advance as the higher signal. For example, if the corresponding value is i, the terminal transmits HARQ-ACK information 636 for the SPS PDSCH 632 and the SPS PDSCH 634 in slot k+i. The transmission period as well as TDRA, which is the time resource information for which the SPS PDSCH is scheduled, should be considered as the position of the HARQ-ACK codebook included in the HARQ-ACK information. Since only one SPS PDSCH can be transmitted per slot, the HARQ-ACK codebook position is determined based on TDRA, which is time resource information, without considering a transmission period. On the other hand, if the DL SPS transmission period is smaller than the slot, the TDRA and the transmission period, which are time resource information, should be considered together to determine the position of the HARQ-ACK codebook. Here, the TDRA includes transmission start symbol and length information of the SPS PDSCH. For example, when the DL SPS transmission period is 7 symbols and the start symbol index of the DL SPS PDSCH determined by TDRA is 2 and the length is 3, two DL SPS PDSCHs may exist in one slot as in case 4 (630) of FIG. 6. That is, the first SPS PDSCH 632 is a PDSCH having OFDM symbol indexes 2, 3, and 4 determined by TDRA, and the second SPS PDSCH 634 is a PDSCH having OFDM symbol indexes 9, 10, and 11 considering TDRA and 7 symbols in transmission periods. That is, the second SPS PDSCH in the slot has the same length as the first SPS PDSCH, but the offset will be a form shifted by a transmission period. In summary, for generating or determining a semi-static HARQ-ACK codebook, the terminal uses time resource allocation information when the SPS PDSCH transmission period is greater than 1 slot for determining the HARQ-ACK codebook position for the SPS PDSCH in one slot, and the time resource allocation information and the SPS PDSCH transmission period are considered together when the SPS PDSCH transmission period is less than 1 slot.

When the SPS PDSCH transmission period is less than 1 slot, it may occur that the SPS PDSCH spans the slot boundary according to the combination of the transmission period and TDRA. The case 6 (650) of FIG. 6 shows an example, and in this case, the base station is configured to repeatedly transmit by dividing one SPS PDSCH into PDSCH 652 and PDSCH 654 over the slot boundary. At this time, the PDSCH 652 and the PDSCH 654 may always have the same length or different lengths. In addition, only one HARQ-ACK information 656 for the SPS PDSCH composed of the PDSCH 652 and the PDSCH 654 is transmitted by the terminal, and the slot serving as the reference is based on the slot k+1 where the last repeated PDSCH 654 is transmitted.

Example 6-1: Semi-Static HARQ-ACK Codebook Mapping Method for DCI Indicating DL SPS Release In a case that the transmission period of the SPS PDSCH becomes smaller than 1 slot, when the terminal transmits HARQ-ACK information for DCI requesting the release of the SPS PDSCH, based on the semi-static HARQ-ACK codebook, the terminal maps the HARQ-ACK codebook for the corresponding DCI by at least one of the following methods.
  Method 6-2-1: The position of the semi-static HARQ-ACK codebook for HARQ-ACK information for the DCI indicating SPS PDSCH release is the same as the position of HARQ-ACK codebook for the SPS PDSCH located first in terms of time resources among the SPS PDSCHs received in one slot.
  When the number of SPS PDSCHs in a slot in which the DCI indicating SPS PDSCH release is transmitted is 2 or more, the terminal maps and transmits HARQ-ACK information for a corresponding DCI to a semi-static HARQ-ACK codebook position for HARQ-ACK information of the SPS PDSCH that is the fastest in time.
  For example, if the maximum number of PDSCHs that can be transmitted/received without receiving simultaneous PDSCHs including SPS PDSCHs in a slot where the DCI indicating SPS PDSCH release is to be transmitted is 4, the HARQ-ACK codebook size for the slot is 4, the HARQ-ACK information for SPS PDSCH or PDSCH reception will be mapped to each position, as {1, 2, 3, 4}. If two SPS PDSCHs have corresponding HARQ-ACK information mapped at positions {2} and {3}, HARQ-ACK information indicating the release of the DL SPS PDSCH is mapped to the position {2}.
  Method 6-2-2: The position of the semi-static HARQ-ACK codebook for HARQ-ACK information for the DCI indicating SPS PDSCH release is the same as the position of the HARQ-ACK codebook for SPS PDSCH located in the last slot in terms of time resources.
  When the number of SPS PDSCHs in a slot in which DCI indicating SPS PDSCH release is transmitted is 2 or more, the terminal maps and transmits HARQ-ACK information for a corresponding DCI to a semi-static HARQ-ACK codebook position for HARQ-ACK information of the SPS PDSCH located last in terms of time resources.
  For example, if the maximum number of PDSCHs that can be transmitted/received without receiving simultaneous PDSCHs including SPS PDSCHs in a slot where the DCI indicating SPS PDSCH release is to be transmitted is 4, the HARQ-ACK codebook size for the slot is 4, and HARQ-ACK information for SPS PDSCH or PDSCH reception will be mapped to each position, as {1, 2, 3, 4}. If two SPS PDSCHs have corresponding HARQ-ACK information mapped at positions {2} and {3}, the HARQ-ACK information indicating the release of the DL SPS PDSCH is mapped to the position {3}.
  Method 6-2-3: The position of the semi-static HARQ-ACK codebook for HARQ-ACK information for the DCI indicating SPS PDSCH release is the same as the positions of all HARQ-ACK codebooks for SPS PDSCHs received in one slot.
  When the number of SPS PDSCHs in a slot in which the DCI indicating SPS PDSCH release is transmitted is two or more, the terminal repeatedly maps and transmits HARQ-ACK information for a corresponding DCI to semi-static HARQ-ACK codebook positions for HARQ-ACK information of all SPS PDSCHs.
  For example, if the maximum number of PDSCHs that can be transmitted/received without receiving simultaneous PDSCHs including SPS PDSCHs in a slot where the DCI indicating SPS PDSCH release is to be transmitted is 4, the HARQ-ACK codebook size for the slot is 4, and HARQ-ACK information for SPS PDSCH or PDSCH reception will be mapped to each position as {1, 2, 3, 4}. If two SPS PDSCHs have corresponding HARQ-ACK information mapped at positions {2} and {3}, HARQ-ACK information indicating the release of DL SPS PDSCH is repeatedly mapped at positions {2} and {3}. That is, the same HARQ-ACK information is mapped to the positions {2} and {3}.
  Method 6-2-4: The position of the semi-static HARQ-ACK codebook for HARQ-ACK information for the DCI indicating SPS PDSCH release is selected by the base station among multiple HARQ-ACK codebook candidate positions for SPS PDSCHs received in one slot as a higher signal or an L1 signal or a combination thereof.
  When the number of SPS PDSCHs in a slot in which DCI indicating SPS PDSCH release is transmitted is two or more, among the semi-static HARQ-ACK codebook positions for HARQ-ACK information of SPS PDSCHs, the base station selects one position by the higher signal, the L1 signal, or a combination thereof, and the terminal transmits by mapping HARQ-ACK information for the corresponding DCI at the selected position.
  For example, if the maximum number of PDSCHs that can be transmitted/received without receiving simultaneous PDSCHs including SPS PDSCHs in a slot where the DCI indicating SPS PDSCH release is to be transmitted is 4, the HARQ-ACK codebook size for the slot is 4, and HARQ-ACK information for SPS PDSCH or PDSCH reception will be mapped to each position, as {1, 2, 3, 4}. If two SPS PDSCHs are mapped to corresponding HARQ-ACK information at positions {2} and {3} respectively, the base station selects {2} using the DCI indicating the release of the DL SPS PDSCH, and the terminal transmits by mapping HARQ-ACK information indicating the release of the DL SPS PDSCH to the position {2}. A DCI field for determining the position of the quasi-static HARQ-ACK codebook may be a time resource allocation field, a HARQ process number, or a PDSCH-to-HARQ feedback timing indicator. For example, the time resource allocation field in the DCI indicating the release of the SPS PDSCH may indicate time resource information of the SPS PDSCH of one of the SPS PDSCHs that can be transmitted in the corresponding slot, and the terminal may transmit the HARQ-ACK information of the DCI to the position of the semi-static HARQ-ACK codebook corresponding to the indicated SPS PDSCH.
  Method 6-2-5: The position of the quasi-static HARQ-ACK codebook for HARQ-ACK information for DCI indicating SPS PDSCH release is indicated or configured by the base station by the higher signal, the L1 signal, or a combination thereof.

If the maximum number of PDSCHs that can be received without overlapping time in the slot in which the DCI indicating SPS PDSCH release is transmitted is two or more, among the semi-static HARQ-ACK codebook positions for the HARQ-ACK information of the corresponding PDSCHs, the base station selects one position as a higher signal, an L1 signal, or a combination thereof, and the terminal maps and transmits the HARQ-ACK information for a corresponding DCI at a selected position.

The set of semi-static HARQ-ACK codebook positions selectable by the base station by method 6-2-4 is composed of semi-static HARQ-ACK codebook positions to which HARQ-ACK information of the SPS PDSCH can be mapped, and the set of semi-static HARQ-ACK codebook positions that can be selected by the base station by method 6-2-5 is composed of semi-static HARQ-ACK codebook positions to which HARQ-ACK information of all PDSCHs can be mapped.

For example, if the maximum number of PDSCHs that can be transmitted/received without receiving simultaneous PDSCHs including SPS PDSCHs in a slot where the DCI indicating SPS PDSCH release is to be transmitted is 4, the size of the HARQ-ACK codebook for the corresponding slot is 4, and HARQ-ACK information for SPS PDSCH or PDSCH reception will be mapped to each position as {1, 2, 3, 4}. The base station selects {1} using the DCI indicating the release of the DL SPS PDSCH, and the terminal transmits HARQ-ACK information indicating the release of the DL SPS PDSCH by mapping the same to the position {1}. A DCI field for determining the position of the quasi-static HARQ-ACK codebook may be a time resource allocation field or a HARQ process number or a PDSCH-to-HARQ feedback timing indicator. For example, a time resource allocation field in the DCI indicating SPS PDSCH release indicates time resource information of one PDSCH among PDSCHs that can be transmitted in a corresponding slot, and the terminal transmits the HARQ-ACK information of the DCI to the position of the semi-static HARQ-ACK codebook corresponding to the indicated PDSCH.

The above-described methods will be possible in a situation in which only one HARQ-ACK transmission is supported in one slot. When code block group (CBG) based transmission is configured for a higher signal through DL SPS PDSCH, the terminal may repeatedly map and transmit the HARQ-ACK information for the DCI indicating DL SPS PDSCH release by the number of CBGs to the semi-static HARQ-ACK codebook resource determined by at least one of the above methods. Although the above-described method is described as a method of transmitting HARQ-ACK information for a DL SPS PDSCH indicating a release for one SPS PDSCH transmission/reception, a method of transmitting HARQ-ACK information for a DL SPS PDSCH indicating a simultaneous release of two or more activated PDSCH transmissions/receptions in one cell/one BWP may be sufficiently possible without adding or subtracting. For example, when one DL SPS PDSCH release signal is associated with multiple SPS PDSCHs activated in one cell/one BWP, the SPS PDSCHs considered for HARQ-ACK codebook position selection may be SPS PDSCHs belonging to one configuration or all configurations as a representative. At this time, if the SPS PDSCHs belongs to a representative configuration, the representative configuration may be the lowest SPS PDSCH configuration number or the first activated SPS PDSCH configuration. This is only an example, and other similar methods may be possible.

Example 6-2: Dynamic HARQ-ACK Codebook Mapping Method for Multiple SPS PDSCHs Transmitted in One Slot In the dynamic HARQ-ACK codebook (or Type 2 HARQ-ACK codebook), the position of the corresponding HARQ-ACK information is determined by Total DAI and Counter DAI included in DCI for scheduling PDSCH. The Total DAI indicates the size of the HARQ-ACK codebook transmitted in slot n, and the Counter DAI indicates the position of the HARQ-ACK codebook transmitted in slot n. Next, in the Rel-15 NR, a dynamic HARQ-ACK codebook is configured by [pseudo-code 3].

[Start Pseudo-Code 3]

If the terminal transmits HARQ-ACK information in a PUCCH in slot n and for any PUCCH format, the terminal determines the $\sim$ACK $\sim$ACK $\frown\sim$ACK $O_o, O_1, \ldots O_o^{ACK-1}$, for a total number of $O_{ACK}$ HARQ-ACK information bits, according to the following pseudo-code:

Set m=0—PDCCH with DCI format 1_0 or DCI format 1_1 monitoring occasion index: lower index corresponds to earlier PDCCH with DCI format 1_0 or DCI format 1_1 monitoring occasion
    Set j=0
    Set $V_{temp}$=O
    Set $V_{temp2}$=O
    Set $V_S$=Ø
    Set $N_{cells}^{DL}$ to the number of serving cells configured by higher layers for the UE
    Set M to the number of PDCCH monitoring occasion(s)
    while m<M
        Set c=O—serving cell index: lower indexes correspond to lower RRC indexes of corresponding cell
        while $c<N_{cells}^{DL}$
    if PDCCH monitoring occasion m is before an active DL BWP change on serving cell c or an active UL BWP change on the PCell and an active DL BWP change is not triggered by a DCI format 1_1 in PDCCH monitoring occasion m
    c=c+1;
    else
        if there is a PDSCH on serving cell c associated with PDCCH in PDCCH monitoring occasion m, or there is a PDCCH indicating SPS PDSCH release on serving cell c if $V_{C-DAI,c,m}^{DL} \leq V_{temp}$ j=j+1 end if $V_{temp}=V_{C-DAI,c,m}^{DL}$ if $V_{T-DAI,m}^{DL}=\emptyset$ $V_{temp2}=V_{C-DAI,c,m}^{DL}$ else $V_{temp2}=V_{T-DAI,m}^{DL}$ end if
if harq-ACK-SpatialBundlingPUCCH is not provided and m is a monitoring occasion for PDCCH with DCI format 1_0 or DCI format 1_1 and the UE is configured by maxNrofCodeWordsScheduledByDCI with reception of two transport blocks for at least one configured DL BWP of at least one serving cell, $$\tilde{o}^{ACK}_{8j+2(V^{DL}_{C-DAI,c,m}-1)} = HARQ\text{-}ACK$$

information bit corresponding to the first transport block of this cell $$\tilde{o}^{ACK}_{8j+2(V^{DL}_{C-DAI,c,m}-1)+1} = HARQ\text{-}ACK$$

information bit corresponding to the second transport block of this cell $$V_s = V_s \cup \{8j+2(V^{DL}_{C-DAI,c,m}-1), 8j+2(V^{DL}_{C-DAI,c,m}-1)+1\}$$

else if harq-ACK-SpatialBundlingPUCCH is provided to the UE and m is a monitoring occasion for PDCCH with DCI format 1_1 and the UE is configured by maxNrofCodeWordsScheduledByDCI with reception of two transport blocks in at least one configured DL BWP of a serving cell, $$\tilde{o}^{ACK}_{4j+V^{DL}_{C-DAI,c,m}-1} = \text{binary}$$

AND operation of the HARQ-ACK information bits corresponding to the first and second transport blocks of this cell $$V_s = V_s \cup \{4j + V^{DL}_{C-DAI,c,m} - 1\}$$

else $$\tilde{o}^{ACK}_{4j+V^{DL}_{C-DAI,c,m}-1} = HARQ\text{-}ACK$$

information bit of this cell $$V_s = V_s \cup \{4j + V^{DL}_{C-DAI,c,m} - 1\}$$
end if
end if
c=c+1
end if
end while
m=m+1
end while
if $V_{temp2} < V_{temp}$
  j=j+1
end if
if harq-ACK-SpatialBundlingPUCCH is not provided to the UE and the UE is configured by maxNrofCodeWordsScheduledByDCI with reception of two transport blocks for at least one configured DL BWP of a serving cell, $$O^{ACK} = 2 \cdot (4 \cdot j + V_{temp2})$$
else
$$O^{ACK} = 4 \cdot j + V_{temp2}$$

end if
$\tilde{o}^{ACK}_i$=NACK for any $i \in \{0,1,...,O^{ACK}-1\} \backslash V_s$
Set c=0
while c < $N^{DL}_{cells}$ if SPS PDSCH reception is activated for a UE and the UE is configured to receive SPS PDSCH in a slot n-$K_{1,c}$ for serving cell c, where $K_{1,c}$ is the PDSCH-to-HARQ-feedback timing value for SPS PDSCH on serving cell c $$O^{ACK} = O^{ACK} + 1$$

$$\tilde{O}^{ACK}_{O^{ACK}-1} = HARQ\text{-}ACK$$

information bit associated with the SPS PDSCH reception
end if
c=c+1;
end while
[End Pseudo-Code 3]

[pseudo-code 3] is applied when the transmission period of the SPS PDSCH is larger than 1 slot, and when the transmission period of the SPS PDSCH is smaller than 1 slot, the dynamic HARQ-ACK codebook will be determined by the following [pseudo-code 4]. Alternatively, regardless of the SPS PDSCH transmission period or the number of SPS PDSCHs activated in one cell/one BWP, [pseudo-code 4] may be generally applied.

[Start Pseudo-Code 4]
If the UE transmits HARQ-ACK information in a PUCCH in slot n and for any PUCCH format, the UE determines the $$\tilde{o}^{ACK}_0, \tilde{o}^{ACK}_1, \ldots, \tilde{o}^{ACK}_{O^{ACK}-1}$$

for a total number of $O_{ACK}$ HARQ-ACK information bits, according to the following pseudo-code:
Set m=0—PDCCH with DCI format 1_0 or DCI format 1_1 monitoring occasion index: lower index corresponds to earlier PDCCH with DCI format 1_0 or DCI format 1_1 monitoring occasion
Set j=0
Set $V_{temp}$=O
Set $V_{temp2}$=O
Set $V_s$=∅
Set $N^{DL}_{cells}$ to the number of serving cells configured by higher layers for the UE
Set M to the number of PDCCH monitoring occasion(s)
while m<M
  Set c=0—serving cell index: lower indexes correspond to lower RRC indexes of corresponding cell
  while c<$N^{DL}_{cells}$
  if PDCCH monitoring occasion m is before an active DL BWP change on serving cell c or an active UL BWP change on the PCell and an active DL BWP change is not triggered by a DCI format 1_1 in PDCCH monitoring occasion m
    c=c+1;
  else
    if there is a PDSCH on serving cell c associated with PDCCH in PDCCH monitoring occasion m, or there is a PDCCH indicating SPS PDSCH release on serving cell c if $V_{C-DAI,c,m}^{DL} \leq V_{temp}$ j=j+1 end if $V_{temp} = V_{C-DAI,c,m}^{DL}$ if $V_{T-DAI,m}^{DL} = \emptyset$ $V_{temp2} = V_{C-DAI,c,m}^{DL}$ else $V_{temp2} = V_{T-DAI,m}^{DL}$ end if if harq-ACK-SpatialBundlingPUCCH is not provided and m is a monitoring occasion for PDCCH with DCI format 1_0 or DCI format 1_1 and the UE is configured by maxNrofCodeWordsScheduledByDCI with reception of two transport blocks for at least one configured DL BWP of at least one serving cell, $\tilde{O}_{8j+2(V_{C-DAI,c,m}^{DL}-1)}^{ACK} = HARQ\text{-}ACK$ information bit corresponding to the first transport block of this cell $\tilde{O}_{8j+2(V_{C-DAI,c,m}^{DL}-1)+1}^{ACK} = HARQ\text{-}ACK$ information bit corresponding to the second transport block of this cell $V_s = V_s \cup \{8j+2(V_{C-DAI,c,m}^{DL}-1), 8j+2(V_{C-DAI,c,m}^{DL}-1)+1\}$ else if harq-ACK-SpatialBundlingPUCCH is provided to the UE and m is a monitoring occasion for PDCCH with DCI format 1_1 and the UE is configured by maxNrofCodeWordsScheduledByDCI with reception of two transport blocks in at least one configured DL BWP of a serving cell, $\tilde{O}_{4j+V_{C-DAI,c,m}^{DL}-1}^{ACK} = $ binary AND operation of the HARQ-ACK information bits corresponding to the first and second transport blocks of this cell $V_s = V_s \cup \{4j + V_{C-DAI,c,m}^{DL} - 1\}$ else $\tilde{O}_{4j+V_{C-DAI,c,m}^{DL}-1}^{ACK} = HARQ\text{-}ACK$ information bit of this cell $V_s = V_s \cup \{4j + V_{C-DAI,c,m}^{DL} - 1\}$
  end if
  end if
  c=c+1
end if
  end while m=m+1
end while
if $V_{temp2} < V_{temp}$
  j=j+1
end if
if harq-ACK-SpatialBundlingPUCCH is not provided to the UE and the UE is configured by maxNrofCodeWordsScheduledByDCI with reception of two transport blocks for at least one configured DL BWP of a serving cell, $O^{ACK} = 2 \cdot (4 \cdot j + V_{temp2})$
else
  $O^{ACK} = 4 \cdot j + V_{temp2}$
end if
$\tilde{o}_i^{ACK}$=NACK for any $i \in \{0,1,...,O^{ACK}-1\}\backslash V_s$
Set c=0
while $c < N_{cells}^{DL}$ if SPS PDSCH reception is activated for a UE and the UE is configured to receive multiple SPS PDSCHs in a slot n=$K_{1,c}$ for serving cell c, where $K_{1,c}$ is the PDSCH-to-HARQ-feedback timing value for SPS PDSCH on serving cell c
  $O^{ACK} = O^{ACK} + k$ where k is the number of multiple SPS PDSCHs in a slot n-$K_{1,c}$
  $O^{ACK} = O^{ACK} - 1$=HARQ-ACK information bit associated with the SPS PDSCH reception
  end if
  c=c+1;
end while
[End Pseudo-Code 4]

In the above-described [pseudo-code 4], the k value, which is the number of SPS PDSCHs in one slot, is applicable only to one SPS PDSCH configuration in one cell/one BWP or when multiple SPS PDSCHs can be configured in one cell/one BWP, all SPS PDSCH configurations may be included.

The [pseudo-code 3] or [pseudo-code 4] may be applied in a situation where HARQ-ACK information transmission is limited to at most one per slot.

Example 6-3: Individual HARQ-ACK Transmission Method for Multiple SPS PDSCHs Transmitted in One Slot When the terminal is configured as a higher signal to perform only one DL SPS transmission period less than one slot and one HARQ-ACK transmission per slot from the base station, the HARQ-ACK information for the DL SPS PDSCH 632 and the DL SPS PDSCH 634 received in slot k is transmitted to the PUCCH of slot k+i indicated by the higher signal or the L1 signal or a combination thereof in advance, as illustrated in case 4 (630) of FIG. 6. For example, the terminal determines the granularity of the PDSCH to HARQ-ACK timing indicator in the DCI format indicating DL SPS activation as a slot level, the base station provides the terminal with a difference value between the slot index on which the DL SPS PDSCH is received, and PUCCH resource to which HARQ-ACK information is transmitted is configured to the terminal as a higher signal in the slot indicated by L1. In case 4 (630) of FIG. 6, PDSCH to HARQ-ACK timing shows a situation in which an i value is indicated. It may be possible to select the corresponding value directly as an L1 signal or to configure candidate values as a higher signal and select one of them as an L1 signal.

When a terminal or a base station wants to separately receive and transmit HARQ-ACK information for DL SPS PDSCHs that are transmitted and received individually, the base station may be configured as a higher signal for DL SPS transmission period smaller than 1 slot and 2 or more HARQ-ACK transmissions per slot. For example, as in case 7 (660) of FIG. 6, the terminal transmits HARQ-ACK information for the SPS PDSCH 662 received in slot k through PUCCH 666 in slot k+i, and the HARQ-ACK information for the SPS PDSCH 664 may be transmitted via the PUCCH 668 in slot k+i. To enable this, as an example, the terminal determines the granularity of the PDSCH to HARQ-ACK timing indicator in the DCI format indicating DL SPS activation as a symbol level, the value means the total symbol length from the transmission end symbol (or transmission start symbol) of the SPS PDSCH to the transmission start symbol (or transmission end symbol) of the PUCCH to which the corresponding HARQ-ACK information is transmitted. In case 7 (660) of FIG. 6, when the end symbol of the SPS PDSCH 662 is s0 and the start symbol of the PUCCH 666 to which HARQ-ACK information for the SPS PDSCH 662 is transmitted is s1, the value indicated by the PDSCH to HARQ-ACK timing indicator will be "s1−s0", this value may be directly selected as the L1 signal, or candidate values may be configured as the higher signal and it may be possible to determine one of them as the L1 signal. Through the above information, the terminal may determine the start symbol of the PUCCH to which HARQ-ACK information for the SPS PDSCH will be transmitted. Other PUCCH transmission information may be determined by a higher signal or an L1 signal or a combination thereof. If the PUCCH resource indicator in the L1 or higher signal of Rel-15 is used, the terminal can determine that the "starting symbol index" field is not used among the values indicated in the indicator. Alternatively, since a starting symbol for transmitting HARQ-ACK information is already provided through PDSCH to HARQ-ACK timing indicator information, a new higher signal without a corresponding field or a signal composed of L1 signals or a combination thereof may be provided to the terminal. In summary, the terminal may perform different interpretations for the PDSCH to HARQ-ACK timing indicator field included in the DCI indicating SPS PDSCH activation according to the SPS PDSCH transmission period.

Method 6-3-1: judging by the slot level
As an example, when the transmission period of the SPS PDSCH is greater than 1 slot, the terminal determines the granularity of the PDSCH to HARQ-ACK timing indicator as a slot level.
Method 6-3-2: judging by the symbol level
For example, if the transmission period of the SPS PDSCH is less than 1 slot, the terminal determines the granularity of the PDSCH to HARQ-ACK timing indicator as a symbol level.

Example 6-4: DL SPS/CG (Configured Grant) Cycle Change Method for Aperiodic Traffic The transmission period of the DL SPS supported by the base station will be a unit of a slot level or a symbol level. If information sensitive to the delay time of equipment operated in the factory occurs periodically and the period is not a value or a multiple of the value supported by the 3GPP standard group, the base station will not be able to configure an effective DL SPS transmission period. For example, if there is a traffic pattern with 2.5 symbol intervals, the base station will not be able to allocate only DL SPSs having a transmission period of 2 or 3 symbols. Accordingly, there is a need to configure a DL SPS transmission period with aperiodicity or to introduce a signal that dynamically changes the transmission period. The terminal can dynamically change the transmission period by at least one of the following methods.

Method 6-4-1: DL SPS transmission cycle allocation method with aperiodicity

The base station may be able to configure the DL SPS transmission period in a bitmap manner. For example, when the bitmap information composed of 10 bits exists as a higher signal, if 1 is a DL SPS transmission and 0 is a DL SPS non-transmission, if the unit of bits means a slot unit, a DL SPS transmission period of various patterns may be created even if it is not a period for 10 slots. And the pattern can be repeated in units of 10 slots. Alternatively, a bitmap size and a section indicated by the bit may be a slot or a symbol or a group of symbols. It may be possible to independently configure corresponding information as a higher signal or to change a range of a transmission interval indicated by each bit according to a bitmap size. For example, when the size of the bitmap is 20, the time range indicated by each bit is 7 symbol units, and when the size of the bitmap is 10, the time range indicated by each bit may be a slot unit.

Alternatively, the base station may configure two or more DL SPS transmission periods in advance as a higher signal and configure a time difference for each successively transmitted DL SPS as a pattern. For example, it may be possible to determine a DL SPS transmission period having 2 symbol intervals and 3 symbol intervals for a 2.5 symbol traffic pattern. Table 8 below is a table for configuring the aperiodic DL SPS transmission period. Z is a decimal number with the value up to the first decimal point, and has a relationship of X<Z<X+1. In one example, when Z is 3.2, X has a value of 3. Gap 1 means a symbol interval between the first SPS PDSCH resource received by the terminal and the second SPS PDSCH resource received after receiving the DCI indicating SPS activation. Gap 2 means a symbol interval between a second SPS PDSCH resource and a third SPS PDSCH resource thereafter. That is, Gap i means the symbol interval between the i-th SPS PDSCH resource and the i+1th SPS PDSCH resource thereafter. Configuration is a parameter for selecting one of various patterns, and Table 8 shows the configuration with a total of 9 patterns. The corresponding parameter is provided to the terminal by the higher signal or the L1 signal, and the terminal can identify the DL SPS PDSCH transmission period pattern by the value indicated by the parameter. As another example, it may be possible to implicitly determine one of the configurations according to the traffic generation period value. As an example, if the corresponding pattern has a 2.3 symbol traffic pattern and the base station and the terminal transmit and receive the corresponding information by configuring a higher signal, the base station and the terminal may determine that configuration 3 is applied.

TABLE 8

| Configuration | 1 | 2 | 3 | 4 | 5 | 6 | 7 | 8 | 9 |
|---|---|---|---|---|---|---|---|---|---|
| Gap 1 | X + 1 | X + 1 | X + 1 | X + 1 | X + 1 | X + 1 | X + 1 | X + 1 | X + 1 |
| Gap 2 | X | X | X | X | X | X + 1 | X + 1 | X + 1 | X + 1 |
| Gap 3 | X | X | X | X + 1 | X + 1 | X | X + 1 | X + 1 | X + 1 |
| Gap 4 | X | X | X + 1 | X | X | X + 1 | X | X + 1 | X + 1 |
| Gap 5 | X | X | X | X | X + 1 | X | X + 1 | X | X + 1 |
| Gap 6 | X | X + 1 | X | X + 1 | X | X + 1 | X + 1 | X + 1 | X + 1 |
| Gap 7 | X | X | X + 1 | X | X + 1 | X + 1 | X | X + 1 | X + 1 |
| Gap 8 | X | X | X | X + 1 | X | X | X + 1 | X + 1 | X + 1 |
| Gap 9 | X | X | X | X | X + 1 | X + 1 | X + 1 | X + 1 | X + 1 |
| Gap 10 | X | X | X | X | X | X | X | X | X |

Method 6-4-2: Dynamic DL SPS transmission period change method

Method 6-4-2-1: DCI indicating DL SPS activation includes transmission period information.

The DL SPS transmission period value is included in the DCI. A set of candidate value is configured as a higher signal in advance for the corresponding transmission period value, and a specific value in the set is selected as the DCI. For example, 1 bit is generated in a corresponding transmission period field in DCI in which a transmission cycle is configured to {1 slot, 2 slot} as a higher signal, and whether the transmission period is 1 slot or 2 slot is informed in 1 bit. That is, when the number of DCI bits is determined according to the set of transmission periods configured as the higher signal and the number of sets is N, the total number of bits of ceil (log 2(N)) is configured in DCI. The DCI corresponds to a non-fallback DCI such as DCI format 1_1, and even if there is no fallback DCI corresponding field such as DCI format 1_0, fixed bit values and periodic values associated with each bit value may be applied.

Method 6-4-2-2: utilize existing field in DCI format indicating DL SPS activation 1

When one field in the DCI format indicating DL SPS activation indicates a specific value, the value of the other field is used to indicate a transmission period rather than a previously indicated value. For example, when all of the bit values of the field indicating the HARQ process number indicate a value of "1", a field indicating time resource information may be used to indicate one DL SPS transmission period from a set of DL SPS transmission periods previously configured as a higher signal.

Method 6-4-2-3: use of existing field in DCI format indicating DL SPS activation 2

In a case of DCI format indicating DL SPS activation, it may be possible that a specific field itself in the DCI format transmission period always indicates a transmission period, or a specific value among specific fields in the DCI format indicates a transmission period. For example, if the time resource allocation field of the DCI format is verified as a format indicating SPS PDSCH activation, the base station determines that the corresponding time resource allocation field is used as a value notifying the start symbol and length of the existing SPS PDSCH, but a value notifying the transmission period of the SPS PDSCH.

Method 6-4-2-4: implicit transmission cycle information configuration based on search space The transmission period value is dynamically changed according to a search space in which DCI indicating SL SPS activation is transmitted. For example, the terminal may implicitly determine that the DCI indicating DL SPS activation transmitted in the common search space has a transmission period A value, and the DCI indicating DL SPS activation transmitted in the terminal specific search space has a transmission period B value. The transmission period A and the transmission period B may be configured by the terminal as a higher signal in advance.

Method 6-4-2-5: implicit transmission cycle information configuration based on DCI format The transmission period value is dynamically changed according to the DCI format indicating DL SPS activation. For example, the terminal may implicitly determine that DCI indicating DL SPS activation transmitted in DCI format 1_0, which is a fallback DIC, has a transmission period A value, and DCI indicating DL SPS activation transmitted in DCI format 1_1, which is a non-fallback DCI, has a transmission period B value. The transmission period A and the transmission period B may be configured by the terminal as a higher signal in advance.

In the disclosure, the terminal does not expect to receive or configure DL SPS PDSCH time resource information beyond the transmission period of the DL SPS. If the corresponding configuration or instruction is issued, the terminal regards as an error and ignores it.

Figure 7:
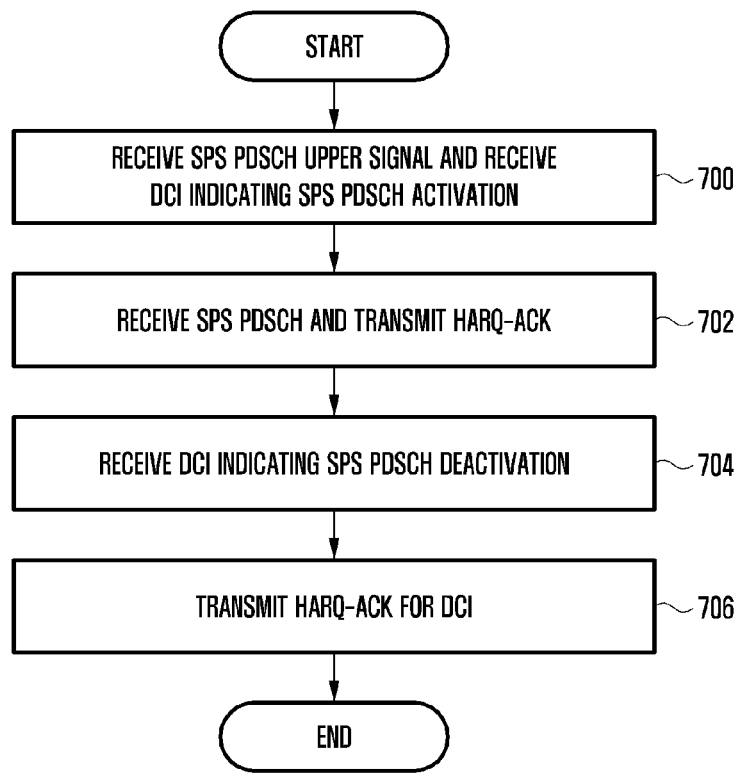
FIG. 7 is a block diagram illustrating a process in which a terminal transmits semi-persistent scheduling (SPS) quasi-static HARQ-ACK codebook-based HARQ-ACK information for downlink control information (DCI) indicating deactivation of a physical downlink shared channel (PDSCH) according to an embodiment of the disclosure.

FIG. 7 is a block diagram illustrating a process in which a terminal transmits semi-persistent scheduling (SPS) quasi-static HARQ-ACK codebook-based HARQ-ACK information for DCI indicating deactivation of SPS PDSCH according to an embodiment of the disclosure.

The terminal receives SPS PDSCH configuration information as a higher signal. At this time, information configured as the higher signal may include a transmission period, an MCS table, and HARQ-ACK configuration information. After receiving the higher signal, the terminal receives (700) the DCI that activates the SPS PDSCH from the base station. After receiving the DCI indicating the activation, the terminal periodically receives the SPS PDSCH and transmits the corresponding HARQ-ACK information to the base station (702). Thereafter, when there is no longer downlink data to be periodically transmitted/received, the base station transmits DCI indicating SPS PDSCH deactivation to the terminal, and the terminal receives it (704). The terminal transmits (706) HARQ-ACK information for DCI indicating the SPS PDSCH deactivation according to the SPS PDSCH transmission period. For example, when the transmission period is greater than 1 slot, the terminal includes and transmits HARQ-ACK information for DCI indicating the SPS PDSCH deactivation in the HARQ-ACK codebook position for HARQ-ACK information corresponding to the SPS PDSCH. HARQ-ACK information can be transmitted by at least one of the above-described method 6-1-1 or method 6-1-2 of FIG. 6. When the transmission period is less than one slot, the terminal may transmit HARQ-ACK information for DCI information indicating SPS PDSCH deactivation by at least one of methods 6-2-1 to 6-2-5. Referring to FIG. 7 are operations applied when the terminal has previously configured a semi-static HARQ-ACK codebook from the base station as a higher signal. In addition, the above descriptions in FIG. 7 can be applied only when the terminal is configured to allow only one HARQ-ACK transmission per a slot in advance with a higher signal or standard or terminal capability.

Figure 8:
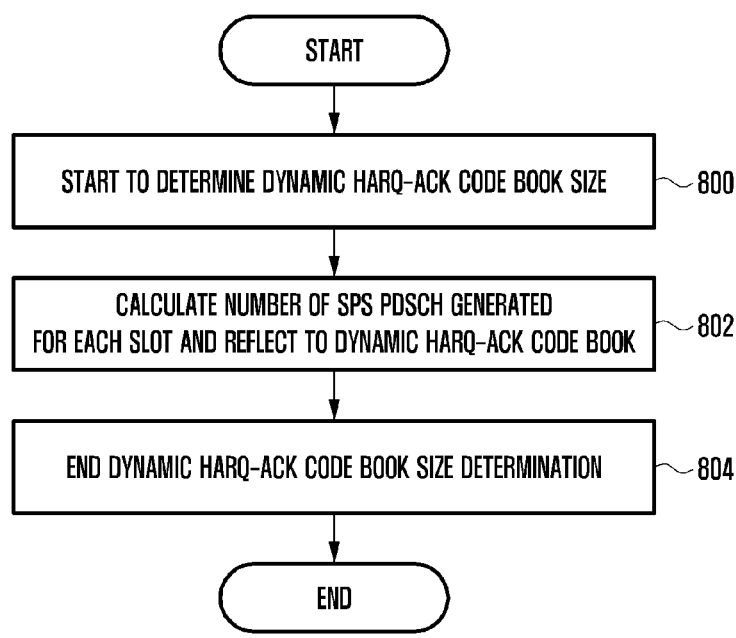
FIG. 8 is a block diagram illustrating a method for a terminal to determine a dynamic HARQ-ACK codebook for SPS PDSCH reception according to an embodiment of the disclosure.

FIG. 8 is a block diagram illustrating a method for a terminal to determine a dynamic HARQ-ACK codebook for SPS PDSCH reception according to an embodiment of the disclosure.

When the terminal is previously configured to operate with a dynamic HARQ-ACK codebook as a higher signal, the terminal starts (800) to determine the size of the HARQ-ACK codebook for HARQ-ACK information to be transmitted in a specific slot. The terminal not only determines the size of the HARQ-ACK codebook for the dynamic scheduled PDSCH, but also calculates the total number of SPS PDSCSHs generated in the slot corresponding to the slot to transmit the HARQ-ACK information and reflects it in the HARW-ACK codebook size (802). The terminal may configure a dynamic HARQ-ACK codebook by at least one of [pseudo-code 3] or [pseudo-code 4] described in FIG. 6. Thereafter, the terminal ends the determination of the size of the HARQ-ACK codebook (804), and transmits HARQ-ACK information from the corresponding slot to the base station. Referring to FIG. 8 may be applied only when the terminal is configured to allow only one HARQ-ACK transmission per slot in advance with a higher signal or standard or terminal capability. For reference, when one SPS PDSCH is repeatedly transmitted across a slot boundary as in case 6 (650) of FIG. 6, when determining the dynamic HARQ-ACK codebook, the terminal determines the size of the HARQ-ACK codebook, based on the slot in which the SPS PDSCH is repeatedly transmitted. Specifically, in case 6 (650) of FIG. 6, in a case of slot k, SPS PDSCH 652 is transmitted, but instead of calculating the number of valid SPS PDSCHs to determine the dynamic HARQ-ACK codebook size, for the SPS PDSCH 654 transmitted in slot k+1, the terminal determines the dynamic HARQ-ACK codebook size. In addition, when determining the number of SPS PDSCHs per slot (k) for determining the dynamic HARQ-ACK codebook size in a specific slot in [pseudo-code 4], the number of valid SPS PDSCHs is calculated by the slot (or the end slot) to which the end symbol of the last SPS PDSCH among the SPS PDSCHs repeatedly transmitted belongs.

Figure 9:
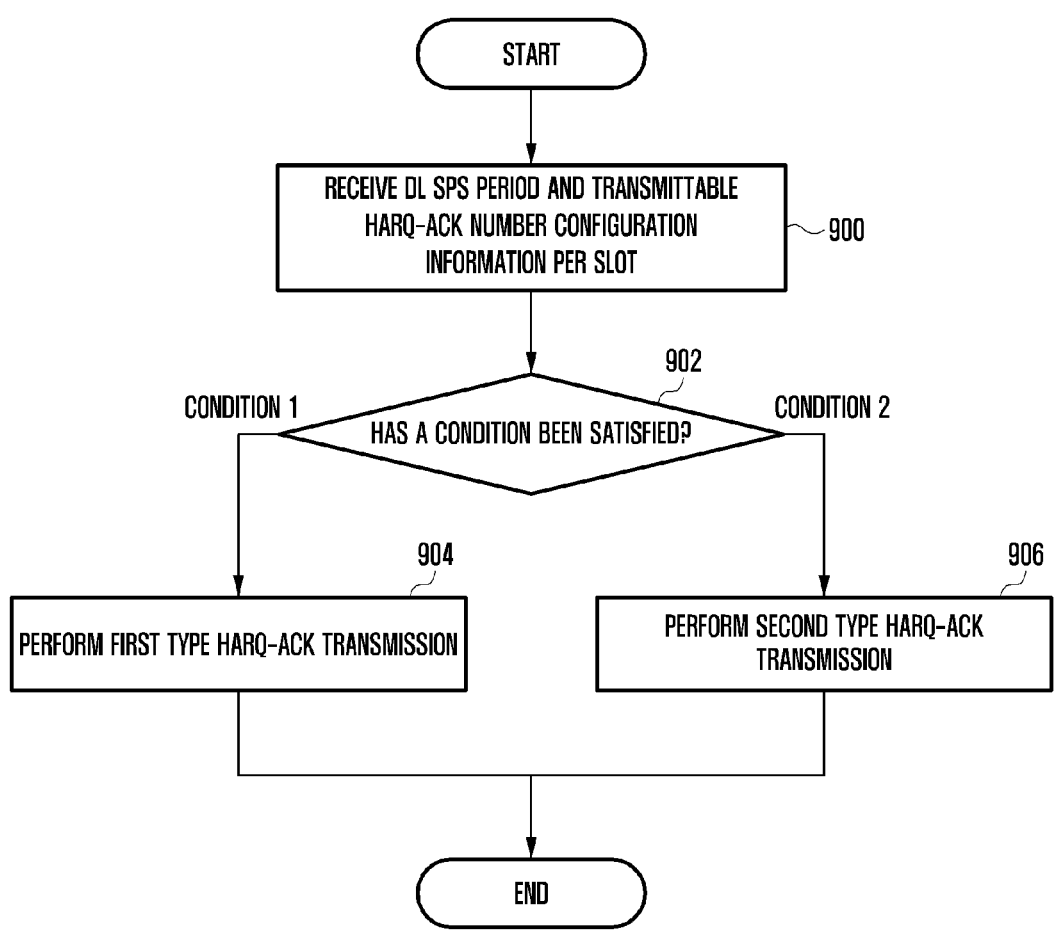
FIG. 9 is a block diagram illustrating a method for a terminal to transmit HARQ-ACK information according to a downlink (DL) SPS transmission period according to an embodiment of the disclosure.

FIG. 9 is a block diagram illustrating a method for a terminal to transmit HARQ-ACK information according to a downlink (DL) SPS transmission period according to an embodiment of the disclosure.

Referring to FIG. 9, the terminal receives (900) the DL SPS transmission period provided by the higher signal or the L1 signal or the maximum number of HARQ-ACK information transmission per slot. Then, the DL SPS transmission period and the HARQ-ACK information transmission conditions per slot are identified (902). If condition 1 is satisfied, the terminal performs (904) the first type of HARQ-ACK information transmission. If condition 2 is satisfied, the terminal performs (906) a second type of HARQ-ACK information transmission. Condition 1 may be at least one of the following:

When the transmission period of DL SPS PDSCH is larger than 1 slot
When only one HARQ-ACK can be transmitted per slot
Condition 2 may be at least one of the following:
When the transmission period of DL SPS PDSCH is less than 1 slot
When two or more HARQ-ACK transmissions are possible per slot The above-described first type HARQ-ACK information transmission includes the following fields in the DCI format indicating activation of the DL SPS PDSCH.

PDSCH to HARQ-ACK feedback timing indicator: Indicate a slot interval in which PDSCH is transmitted and a slot in which HARQ-ACK information is transmitted in units of slots. When one SPS PDSCH is repeatedly transmitted across a slot boundary as in case 6 (650) of FIG. 6, the reference of the slot in which the PDSCH is transmitted is the slot of the last repeatedly transmitted SPS PDSCH.
PUCCH resource indicator: number of symbols, start symbol, PRB index, PUCCH format, etc.

Through the above information, the terminal can configure the PUCCH transmission resource and transmission format to which HARQ-ACK information for the DL SPS PDSCH will be transmitted. In addition, a set of values may be configured as a higher signal in advance for the two field values, and one of them is selected as DCI.

The above-described second type HARQ-ACK information transmission includes the following fields in the DCI format indicating activation of the DL SPS PDSCH.

PDSCH to HARQ-ACK feedback timing indicator: Indicate the end symbol interval of the PDSCH and the start symbol interval where HARQ-ACK information is transmitted in units of symbols
PUCCH resource indicator: number of symbols, PRB index, PUCCH format, etc.

Through the information, the terminal may configure the PUCCH transmission resource to which HARQ-ACK information for DL SPS PDSCH to be transmitted and transmission format. In addition, a set of values may be configured as a higher signal in advance for the two field values, and one of them is selected as DCI.

Figure 10:
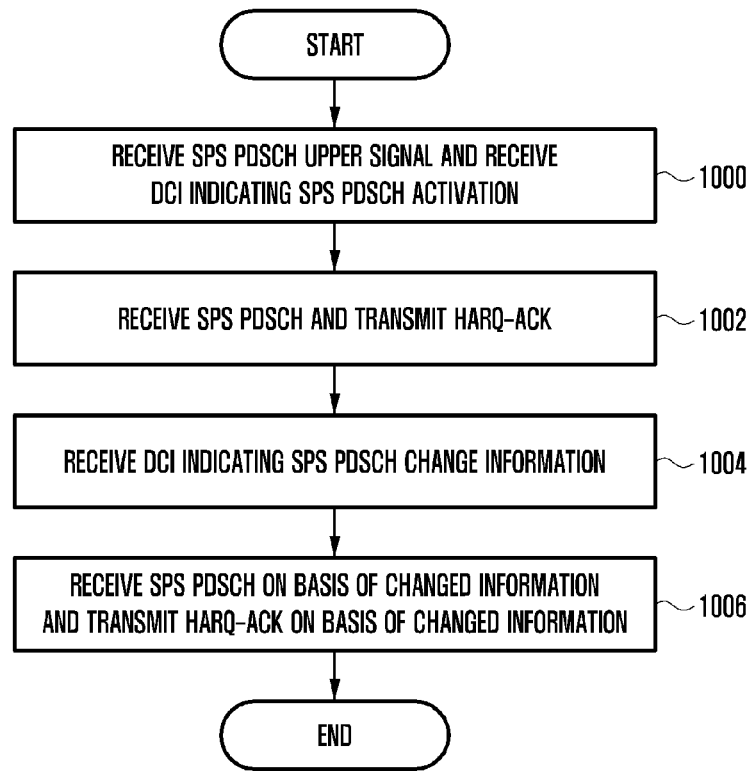
FIG. 10 is a block diagram for concurrently operating a terminal for dynamically changing a DL SPS transmission period according to an embodiment of the disclosure.

FIG. 10 is a block diagram for concurrently operating a terminal for dynamically changing a DL SPS transmission period according to an embodiment of the disclosure.

Referring to FIG. 10, the terminal receives higher information of the SPS PDSCH including information such as a transmission period, MCS table, and HARQ-ACK information. Thereafter, the terminal receives (1000) DCI indicating SPS PDSCH activation. The terminal then transmits (1002) SPS PDSCH reception and corresponding HARQ-ACK information to the base station in the resource region determined by the higher signal and the L1 signal. The terminal receives (1004) the DCI indicating the SPS PDSCH change information. Here, the change information may include the SPS PDSCH transmission period value in addition to the MCS value or the frequency and time resource region size. For reference, the change of the SPS PDSCH transmission period may be possible by at least one of methods 6-4-1 to 6-4-2 described above in FIG. 6. After receiving the DCI, the terminal receives the SPS PDSCH with the changed information and transmits the corresponding HARQ-ACK information to the base station (1006). When the SPS PDSCH transmission period is changed to a higher signal or an L1 signal, when an SPS PDSCH occurs beyond a slot boundary that may be generated according to a transmission period and a time resource region in which the SPS PDSCH is transmitted/received, the terminal may transmit and receive the corresponding SPS PDSCH by at least one of the following methods.

Method 10-1: The SPS PDSCH is not received.
For example, if the SPS PDSCH is allocated over the slot k and slot k+1 as shown in 650 of FIG. 6, the terminal regards the allocated SPS PDSCH as incorrectly configured and does not receive it and also does not transmit the corresponding HARQ-ACK information.

Method 10-2: Repeated transmission/reception by dividing the SPS PDSCH based on a slot boundary
For example, if the SPS PDSCH is allocated over the slot k and slot k+1 as in the case 6 (650) of FIG. 6, the terminal determines that the SPS PDSCH is divided and repeatedly received in the form of SPS PDSCH 652 and SPS PDSCH 654. And the terminal transmits only one HARQ-ACK information, based on the last SPS PDSCH 654.

Method 10-3: For the corresponding SPS PDSCH, the corresponding partial transmission/reception is performed only in the slot before the slot boundary.

For example, if the SPS PDSCH is allocated over slot k and slot k+1 as in case 7 (650) of FIG. 6, the terminal determines that a valid SPS PDSCH is allocated only to the SPS PDSCH 652, and receives the SPS PDSCH. That is, transmission/reception are not performed on the SPS PDSCH 654. And when the terminal transmits HARQ-ACK information, only one is transmitted based on the SPS PDSCH 652.

Method 10-4: For the corresponding SPS PDSCH, transmission/reception is performed only for a slot that exceeds a slot boundary.

For example, if the SPS PDSCH is allocated over slot k and slot k+1 as in case 6 (650) of FIG. 6, the terminal determines that a valid SPS PDSCH is allocated only to the SPS PDSCH 654, and receives the SPS PDSCH. That is, the SPS PDSCH 652 does not transmit and receive. And when the terminal transmits HARQ-ACK information, only one is transmitted based on the SPS PDSCH 654.

Figure 11:
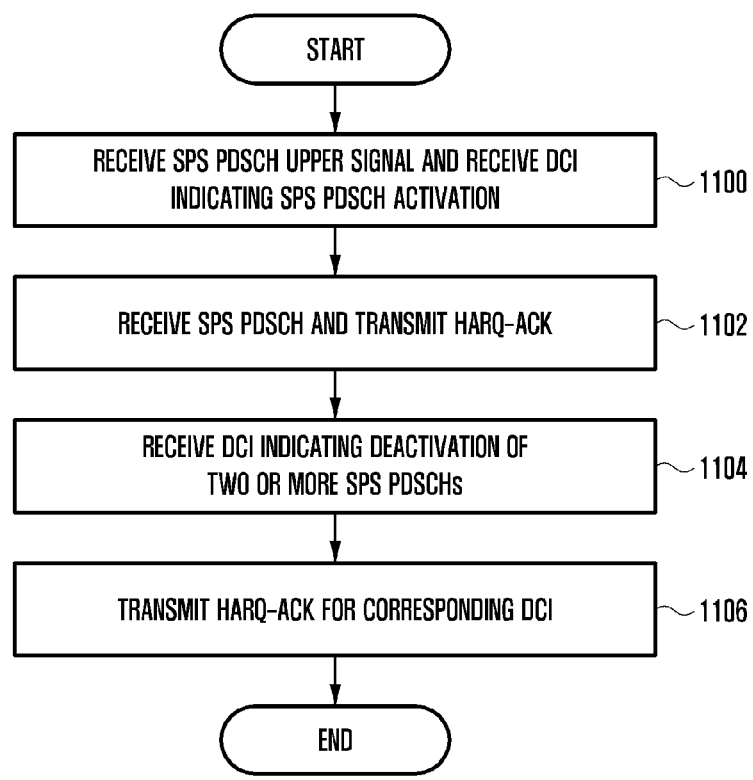
FIG. 11 is a diagram illustrating a method of transmitting HARQ-ACK information for SPS release of a terminal in a situation where two or more DL SPSs are activated according to an embodiment of the disclosure.

FIG. 11 is a diagram illustrating a method of transmitting HARQ-ACK information for SPS release of a terminal in a situation where two or more DL SPSs are activated according to an embodiment of the disclosure.

Referring to FIG. 11, when the terminal can operate two or more active DL SPS in one cell/one BWP, the base station can configure two or more DL SPS to one terminal. The reason for supporting two or more DL SPS configurations is that when the terminal supports various traffics, it may be advantageous to configure DL SPS for each purpose because different MCS or time/frequency resource allocation or period may be different for each traffic.

The terminal receives the following higher signal configuration information for the DL SPS.

Periodicity: DL SPS transmission cycle
nrofHARQ-Processes: Number of HARQ processes set for DL SPS
n1PUCCH-AN: HARQ resource configuration information for DL SPS
mes-Table: MCS table configuration information applied to DL SPS
SPS index: Index of SPS configured in one cell/one BWP The SPS index among the higher signal configuration information may be used for the purpose of indicating which SPS is indicated by DCI (L1 signaling) providing SPS activation or deactivation. Specifically, in a situation in which two SPSs are configured as a higher signal in one cell/one BWP, the terminal will need index information informing the higher SPS information in order to know that DCI indicating SPS activation indicates which SPS is activated from the two SPSs. As an example, the HARQ process number field in DCI indicating SPS activation or deactivation indicates an index of a specific SPS, and through this, the terminal may enable or deactivate. Specifically, as shown in Table 9, when the DCI including the CRC scrambled with CG-RNTI includes the following information and the new data indicator (NDI) field of the corresponding DCI indicates 0, the terminal determines that it indicates a specific SPS PDSCH release (deactivation) that has been activated.

TABLE 9

|  | DCI format 0_0 | DCI format 1_0 |
| --- | --- | --- |
| HARQ process number | SPS index | SPS index |
| Redundancy version | set to '00' | set to '00' |
| Modulation and coding scheme | set to all '1's | set to all '1's |
| Frequency domain resource assignment | set to all '1's | set to all '1's |

In Table 9, it may be possible for one HARQ process number to indicate one SPS index or to indicate a plurality of SPS indexes. In addition to the HARQ process number field, it may be possible to indicate one or a plurality of SPS index(es) by other DCI fields (time resource field, frequency resource field, MCS, RV, PDSCH-to-HARQ timing field, etc.). Basically, one SPS can be activated or deactivated by one DCI. The position of the type 1 HARQ-ACK codebook for HARQ-ACK information for DCI indicating SPS PDSCH release is the same as the position of the type 1 HARQ-ACK codebook corresponding to the reception position of the corresponding SPS PDSCH. When the position of the HARQ-ACK codebook corresponding to the candidate SPS PDSCH reception in the slot is k1, the position of the HARQ-ACK codebook for DCI indicating the release of the SPS PDSCH is also k1. Therefore, when DCI indicating SPS PDSCH release in slot k is transmitted, the terminal will not expect to be scheduled for the PDSCH corresponding to the HARQ-ACK codebook position k1 in the same slot k, and if such a situation occurs, the terminal regards it as an error case.

In Table 9, DCI formats 0_0 and 1_0 are exemplified, but DCI formats 0_1 and 1_1 are applicable, and DCI formats 0_x and 1_x can be sufficiently extended to apply.

By the above-described operation, the terminal may simultaneously operate (1100) one or more SPS PDSCHs in one cell/one BWP by receiving the SPS PDSCH higher signal and DCI indicating activation of the SPS PDSCH. Thereafter, the terminal periodically receives the activated SPS PDSCH in one cell/one BWP and transmits (1102) HARQ-ACK information corresponding thereto to the base station. The HARQ-ACK information corresponding to the SPS PDSCH is determined by the terminal by PDSCH-to-HARQ-ACK timing included in the activated DCI information through accurate time and frequency information in the corresponding slot and PUCCH format information through n1 PUCCH-AN information included in the slot interval information and SPS higher configuration information. If there is no PDSCH-to-HARQ-ACK timing field included in the DCI information, the terminal assumes that one value configured in advance as the higher signal is the default value and determines that the corresponding value is applied.

When the terminal receives (1104) DCI indicating the deactivation (or release) of one SPS PDSCH in a situation where the Type 1 HARQ-ACK codebook is configured, the terminal transmits HARQ-ACK information by including the position of the HARQ-ACK codebook for the HARQ-ACK information for the DCI in the corresponding HARQ-ACK codebook position of the SPS PDSCH reception. If the deactivation of two or more SPS PDSCHs is indicated by one DCI, it may be a problem that the terminal should transmit the HARQ-ACK information for the DCI in a certain HARQ-ACK codebook position. To solve this, the terminal transmits (1106) HARQ-ACK using at least one of the following methods.

Method a-1: Lowest Index (or Highest Index)

In this method, when two or more SPS PDSCHs are deactivated by DCI indicating deactivation, the HARQ-ACK codebook position corresponding to the SPS PDSCH reception having the smallest value (or the highest value or the middle value) among the indexes of the corresponding SPS PDSCH includes HARQ-ACK information corresponding to DCI indicating the deactivation. For example, if SPS PDSCH index 1, SPS PDSCH index 4, and SPS PDSCH index 5 are simultaneously deactivated by one DCI, the terminal includes and transmits HARQ-ACK information for the DCI to the HARQ-ACK codebook position corresponding to SPS PDSCH index 1 (or 5).

Method a-2: Earliest HARQ-ACK Codebook Occasion (Latest HARQ-ACK Codebook Occasion)

In this method, when two or more SPS PDSCHs are deactivated by DCI indicating deactivation, HARQ-ACK information corresponding to DCI indicating the deactivation is included in the HARQ-ACK codebook located at the earliest (or the latest) among the positions of the HARQ-ACK codebook of the corresponding SPS PDSCHs. For example, in a situation where SPS PDSCH index 1, SPS PDSCH index 4, and SPS PDSCH index 5 are simultaneously deactivated by one DCI. If the HARQ-ACK codebook position corresponding to PDSCH reception of SPS PDSCH index 1 is $k_1$, if the HARQ-ACK codebook position corresponding to PDSCH reception of SPS PDSCH index 2 is $k_2$, and if HARQ codebook position corresponding to PDSCH reception of SPS PDSCH index 3 is $k_3$, and $k_1 < k_2 < k_3$, the terminal transmits by HARQ-ACK information corresponding to the DCI in $k_1$ (or $k_3$). If the positions of the HARQ-ACK codebooks for the PDSCH reception of two or more SPS PDSCHs are the same, the terminal regards them as one and performs the above operation.

Method a-3: All HARQ-ACK Codebook Occasions

In this method, when two or more SPS PDSCHs are deactivated by DCI indicating deactivation, instead of selecting the HARQ-ACK codebook position according to the above-described method a-1 or a-2, the HARQ-ACK information for the DCI is transmitted in all HARQ-ACK codebook positions. For example, when SPS PDSCH index 1, SPS PDSCH index 4, and SPS PDSCH index 5 are simultaneously deactivated by one DCI, the terminal includes HARQ-ACK information for the DCI in HARQ-ACK codebook positions corresponding to SPS PDSCH index 1, 4, and 5 and transmits the same. If at least two HARQ-ACK codebook positions of the SPS PDSCH are the same, the terminal regards them as one and transmits HARQ-ACK information. As another example, in a situation where SPS PDSCH index 1, SPS PDSCH index 4, and SPS PDSCH index 5 are simultaneously deactivated by one DCI, if the HARQ-ACK codebook position corresponding to PDSCH reception of SPS PDSCH index 1 is $k_1$, if the HARQ-ACK codebook position corresponding to PDSCH reception of SPS PDSCH index 2 is $k_2$, and if the HARQ-ACK codebook position corresponding to PDSCH reception of SPS PDSCH index 3 is $k_3$, and $k_1 < k_2 < k_3$, the terminal includes HARQ-ACK information corresponding for the DCI in $k_1$, $K_2$, and $k_3$ and transmits the same. If the positions of the HARQ-ACK codebooks for the PDSCH reception of two or more SPS PDSCHs are the same, the terminal regards them as one and performs the above operation.

Method a-4: gNB Configuration

First, this method means that the base stations determine the above-described methods a-1 to a-3 as a higher signal. Secondly, it may be possible for the base station to directly determine the position of the HARQ-ACK codebook as a higher signal or an L1 signal in addition to the methods a-1 to a-3. At this time, when two or more SPS PDSCHs are deactivated by one DCI, the position of the HARQ-ACK codebook that can be determined by the base station may be determined as a higher or L1 signal in a possible candidate HARQ-ACK codebook position candidate of the corresponding SPS PDSCHs, or regardless of this, may be determined as a higher or L1 signal.

When the terminal receives the DCI indicating the release or deactivation of the one or more SPS PDSCHs, the terminal does not expect to receive the same HARQ-ACK codebook position to transmit HARQ-ACK information for the DCI and the HARQ-ACK codebook position to transmit HARQ-ACK information for PDSCH scheduled by another DCI. When receiving such a scheduling, the terminal regards it as an error case and performs an arbitrary operation.

Figure 12:
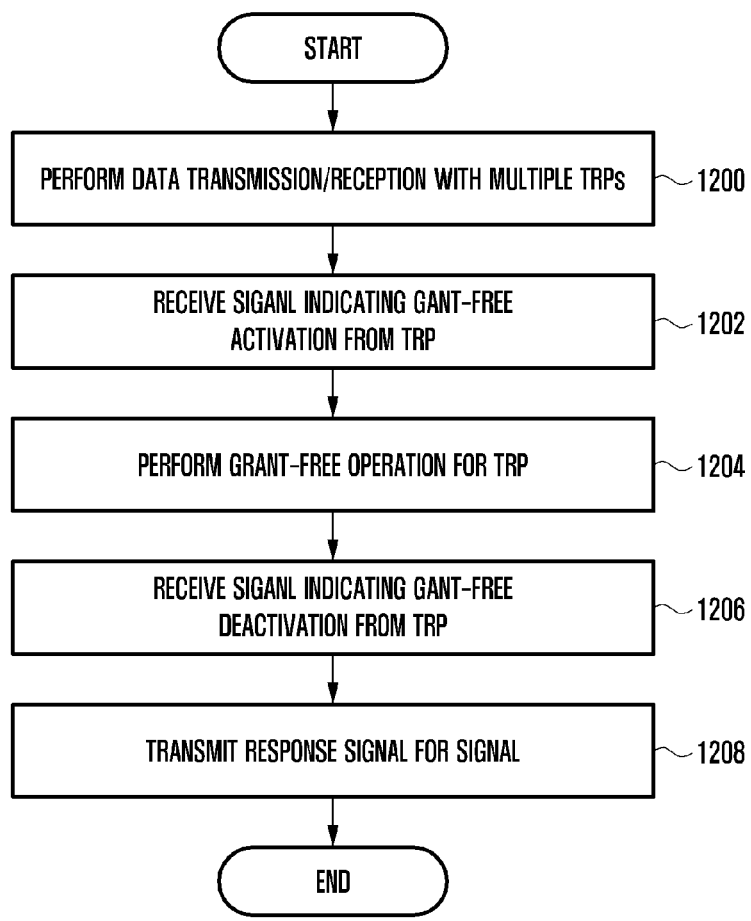
FIG. 12 is a view illustrating a grant-free operation in a situation in which a terminal is connected to two or more transmission and reception points (TRP) according to an embodiment of the disclosure.

FIG. 12 is a block diagram for a grant-free operation in a situation in which a terminal is connected to two or more transmission and reception points (TRPs) according to an embodiment of the disclosure.

Referring to FIG. 12, the terminal may perform (1200) transmission of multiple TRPs and data. Here, the term TRP can be used interchangeably with the term of a base station or a base station (BS). In this situation, the terminal receives (1202) a signal instructing grant-free activation from one or more TRPs. At this time, the signal may be a higher signal or an L1 signal. Thereafter, after receiving the signal indicating the activation information, the terminal transmits or receives (1204) data from one or more TRP and grant-free resources. In addition, the terminal can receive one or more grant-free resource configurations in one cell and one BWP. Thereafter, the terminal receives (1206) a signal indicating grant-free deactivation/release from one or more TRPs. At this time, the signal may be a higher signal or an L1 signal. The terminal transmits (1208) a response signal to the signal. For example, when grant-free is SPS, the signal is DCI, and at this time, the terminal transmits HARQ-ACK information for DCI. As another example, when grant-free is configured grant type 2, the signal is DCI, and at this time, the terminal transmits response information for DCI to MAC CE and confirmation information to the TRP.

As grant-free operation, there are largely configured grant type 1 and configured grant type 2 in the uplink and SPS in the downlink. In the configured grant type 1, the configured grant resource configuration, activation, and deactivation are performed by the higher signal, and in the configured grant type 2, some resource configuration information is transmitted through the higher signal, and the remaining configuration information, activation, and deactivation of the configured grant resource are performed through DCI (L1 signal). In the description, it is described as grant-free for convenience. In a situation where two or more grant-free configurations are possible within one cell or one BWP, when a terminal can transmit and receive data with two or more TRPs, one grant-free resource may be able to transmit and receive data in association with one TRP. As an example, when grant-free resource A is configured, the terminal determines that the corresponding grant-free resource is associated with TRP 1 and receives or transmits data from TRP 1 and periodic grant-free resource.

Specifically, in the case of the configured grant type 1, since the configured grant resource configuration, activation, and deactivation are indicated only by the higher signal without the L1 signal, the higher signal information may include information indicating from which TRP the configured grant is transmitted. For example, the following parameters may be present among higher information on the configured grant type.

TRP Index (or Spatial Domain Information): TRP Information Linked to the Configured Grant One or more TRPs associated with one configured grant may be associated. Specifically, when a plurality of TRPs linked to a configured grant are linked, it can be detailed in the following situation.

Situation b-1: Each configured grant resource is associated with a different TRP. For example, when one configured grant resource is periodically configured and the terminal is connected to two TRPs, the odd-numbered configured grant from the time when the configured grant is activated may be able to be associated with TRP 1, and the even-numbered configured grant may be able to be associated with TRP 2. If this is generalized, a TRP associated with a specific configured grant may be determined by a formula such as "configured grant index" mod "TRP number"="TRP index".

Situation b-2: All configured grant resources are associated with two or more TRPs. For each configured grant occasion, the terminal may be able to transmit data to a plurality of TRPs.

Situation b-3: Transmission period is determined for each TRP regardless of the configured grant index, so that a specific configured grant can be associated with one TRP, and another configured grant can be associated with multiple TRP. For example, in a situation where a terminal is connected to two TRPs, when TRP 1 is associated with all configured grant resources and TRP 2 is associated with even-numbered configured grant resources, when data is generated only for TRP 1 in odd numbered configured grant resources, the terminal transmits, and when data is generated for TRP 1 and TRP 2 in even-numbered configured grant resources, the terminal transmits data from the corresponding resource.

The above-described situation is applicable to all grant-free operations including SPS. The information in which the one grant-free resource is associated with a plurality of TRPs may be configured as a higher or L1 signal. In the case of SPS, the terminal transmits data without a separate grant when data is generated as a configured grant resource configured for the TRP indicated in the TRP index, after receiving configuration information and activation information of configured grant type 1.

In the case of configured grant type 2, some information is transmitted by the higher signal, and the remaining configuration information, activation, and deactivation are indicated by the L1 signal. If the higher signal has the TRP index information, the terminal receives the L1 signal instructing activation of the configured grant type 2 according to the information, and then, when there is data to be sent to the configured grant resource for the TRP indicated in the TRP index provided by the corresponding higher configuration information, the corresponding data is transmitted without a separate grant. On the other hand, if there is no information on the TRP index in the higher configuration information, the terminal implicitly determines the TRP to transmit data for the resource configured as the configured grant according to the TRP associated with the CORESET where the DCI indicating activation of the configured grant type 2 is transmitted. As an example, if a DCI indicating activation of configured grant type 2 is transmitted from TRP 1, when the terminal generates data for the activated configured grant resource, the terminal transmits the data to TRP 1 without a separate grant. At least one of the following two methods may be used for TRP in which DCI indicating that the configured grant type 2 is deactivated is transmitted.

Method b-1: The configured grant resource associated with TRP 1 can only indicate the release of the configured grant from the DCI transmitted from the CORESET of TRP 1. If one DCI supports simultaneous release of two or more configured grant resources, according to this method, the two or more configured grants should all be associated with TRP 1.

Method b-2: Unlike Method b-1, DCI transmitted from a CORESET associated with a TRP other than TRP 1 may also indicate the release of the configured grant. If one DCI supports simultaneous release of two or more configured grant resources, according to this method, the two or more configured grants may be associated with different TRPs.

In the case of SPS, the detailed operation of the configured grant type 2 described above is mostly similar, and in other parts, the terminal receives data for the activated SPS resource and reports HARQ-ACK information on it. When the corresponding SPS resource is associated with TRP 1, the terminal transmits HARQ-ACK information for data received by the corresponding SPS resource to TRP 1. If the SPS resource is associated with two or more TRPs, the TRP to which the terminal will send HARQ-ACK information may be determined according to the above-described situation. If, in one SPS configuration, a specific SPS resource is received from TRP 1, the terminal transmits HARQ-ACK information for the PDSCH received from the SPS to TRP 1. If, in one SPS configuration, a specific SPS resource is received from TRP 1 and TRP 2, the terminal transmits the HARQ-ACK information for the PDSCH received from the SPS to the TRP 1 or TRP 2 by the higher signal configuration or L1 signal indication. Or, when a specific SPS resource is received from TRP 1 and TRP 2 in one SPS configuration, the terminal transmits HARQ-ACK information for the PDSCH received from the SPS to TRP 1 (or TRP 1 in a case that TRP 1 is master TRP) having the lowest index.

As another example, in a situation in which DCI instructing activation from configured grant type 2 or SPS is transmitted as a CORESET associated with TRP 1, the TRP associated with the configured grant type 2 or SPS may be sufficient to be a TRP other than TRP 1. Specifically, when the terminal determines TRP connection information for the configured grant type 2 or SPS as a higher signal in advance, the operation may be possible. Alternatively, it may be possible to add a field directly indicating TRP information to DCI information indicating activation, or to indirectly indicate TRP information using an HARQ process number or RV value in DCI.

As another example, when different grant-free resources associated with one TRP overlap, the terminal should select one of them and transmit or receive data as a grant-free resource. At this time, in the method of selection, when the terminal is implemented or in a case of grant-free resource, the priority value may be able to be transmitted by the higher signal configuration or the L1 signal indication, and the terminal may be able to transmit or receive a grant-free resource with a higher priority, based on the priority value. If different grant-free resources associated with different TRPs overlap, the terminal may be able to transmit or receive data for the grant-free resources without applying the selection method.

Figure 13:
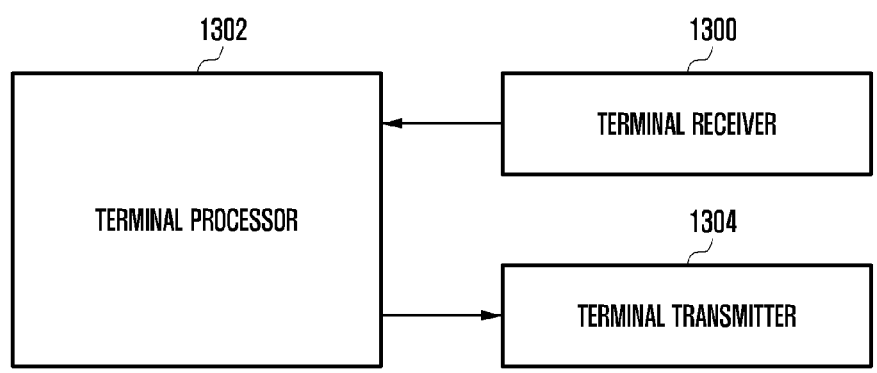
FIG. 13 is a block diagram illustrating a structure of a terminal capable of performing an embodiment according to an embodiment of the disclosure.

FIG. 13 is a block diagram illustrating a structure of a terminal capable of performing an embodiment according to an embodiment of the disclosure.

Referring to FIG. 13, the terminal of the disclosure may include a terminal receiver 1300, a terminal transmitter 1304, and a terminal processor 1302. The terminal receiver 1300 and the terminal transmitter 1304 may be collectively referred to as a transceiver in an embodiment. The transceiver may transmit and receive signals to and from a base station. The signal may include control information and data. To this end, the transceiver may be composed of an RF transmitter that up-converts and amplifies the frequency of the transmitted signal, an RF receiver that amplifies the received signal with low noise and down-converts the frequency. In addition, the transceiver may receive a signal via a wireless channel, output the signal to the terminal processor 1302, and transmit a signal output from the terminal processor 1302 via the wireless channel. The terminal processor 1302 may control a series of processes so that the terminal operates according to the above-described embodiment.

Figure 14:
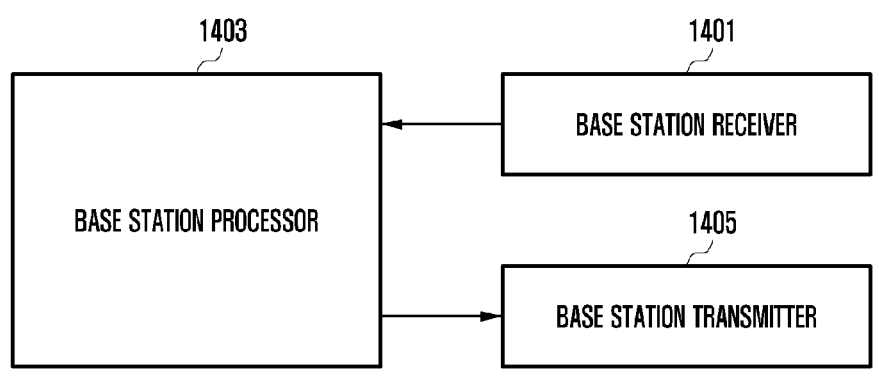
FIG. 14 is a block diagram illustrating a structure of a base station capable of performing an embodiment according to an embodiment of the disclosure.

FIG. 14 is a block diagram illustrating a structure of a base station capable of performing an embodiment according to an embodiment of the disclosure.

Referring to FIG. 14, in the embodiment, the base station may include at least one of a base station receiver 1401, a base station transmitter 1405, and a base station processor 1403. The base station receiver 1401 and the base station transmitter 1405 may be collectively referred to as a transceiver in an embodiment. The transceiver may transmit and receive signals to and from a terminal. The signal may include control information and data. To this end, the transceiver may be composed of an RF transmitter that up-converts and amplifies the frequency of the transmitted signal, an RF receiver that amplifies the received signal with low noise and down-converts the frequency. In addition, the transceiver may receive a signal via a wireless channel, output the signal to the base station processor 1403, and transmit a signal output from the base station processor 1403 via the wireless channel. The base station processor 1403 may control a series of processes so that the terminal operates according to the above-described embodiment.

In the drawings in which methods of the disclosure are described, the order of the description does not always correspond to the order in which operations of each method are performed, and the order relationship between the operations may be changed or the operations may be performed in parallel.

In this disclosure, the terminal operation for the SPS PDSCH has been mainly described, but it may be possible to apply equally to grant-free PUSCH (or configured grant type 1 and type 2).

Further, in methods of the disclosure, some or all of the contents of each embodiment may be combined without departing from the essential spirit and scope of the disclosure.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical spirit of the disclosure. Further, the above respective embodiments may be employed in combination, as necessary. For example, the embodiments of the disclosure may be partially combined to operate a base station and a terminal. Further, although the above embodiments have been described by way of the NR system, other variants based on the technical idea of the embodiments may be implemented in other systems such as FDD and TDD LTE systems.

While the disclosure has been shown described with reference to various embodiments thereof, it will be understood by those skilled in the art that that various changes in form and details may be made therein without departing from the spirit and scope of the disclosure as defined by the appended claims and their equivalents.

What is claimed is:

1. A method performed by a terminal in a communication system, the method comprising:
   receiving, from a base station, a plurality of semi persistent scheduling (SPS) physical downlink shared channel (PDSCH) configurations, wherein the plurality of SPS PDSCH configurations respectively including SPS configuration indexes;
   receiving from the base station, a plurality of downlink control information (DCI) formats indicating activations of SPS PDSCHs respectively corresponding to the SPS configuration indexes;
   receiving, from the base station, a single DCI format indicating a plurality of SPS PDSCH releases;
   obtaining a hybrid automatic repeat request acknowledgement (HARQ-ACK) codebook including HARQ-ACK information corresponding to the plurality of SPS PDSCH releases; and
   transmitting, to the base station, the HARQ-ACK codebook,
   wherein a location in the HARQ-ACK codebook for the HARQ-ACK information is same as for a corresponding SPS PDSCH reception with a lowest SPS configuration index among the plurality of SPS PDSCH releases, and
   wherein the plurality of SPS PDSCH releases are indicated based on a value of a HARQ process number field in the single DCI format.

2. The method of claim 1, further comprising receiving, from the base station, a radio resource control (RRC) message including information configuring the HARQ-ACK codebook as semi-static.

3. The method of claim 1, wherein the single DCI format is identified as a valid release based on: (i) a cyclic redundancy check (CRC) of the single DCI format being scrambled with a configured scheduling radio network temporary identifier (CS-RNTI), (ii) a new data indicator field in the single DCI being set to 0, and (iii) a redundancy version field, a modulation and coding scheme field, and a frequency domain resource assignment field corresponding to predetermined values, respectively.

4. The method of claim 1, wherein the HARQ-ACK codebook is transmitted to the base station on a physical uplink control channel (PUCCH).

5. A method performed by a base station in a communication system, the method comprising:
   transmitting, to a terminal, a plurality of semi persistent scheduling (SPS) physical downlink shared channel (PDSCH) configurations, wherein the plurality of SPS PDSCH configurations respectively including SPS configuration indexes;
   transmitting, to the terminal, a plurality of downlink control information (DCI) formats indicating activations of SPS PDSCHs respectively corresponding to the SPS configuration indexes;
   transmitting, to the terminal, a single DCI format indicating a plurality of SPS PDSCH releases; and
   receiving, from the terminal, a hybrid automatic repeat request acknowledgement (HARQ-ACK) codebook including HARQ-ACK information corresponding to the plurality of SPS PDSCH releases,
   wherein a location in the HARQ-ACK codebook for the HARQ-ACK information is same as for a corresponding SPS PDSCH reception with a lowest SPS configuration index among the plurality of SPS PDSCH releases, and wherein the plurality of SPS PDSCH releases are indicated based on a value of a HARQ process number field in the single DCI format.

6. The method of claim 5, further comprising transmitting, to the terminal, a radio resource control (RRC) message including information configuring the HARQ-ACK codebook as semi-static.

7. The method of claim 5, wherein the single DCI format corresponds to a valid release based on: (i) a cyclic redundancy check (CRC) of the single DCI format being scrambled with a configured scheduling radio network temporary identifier (CS-RNTI), (ii) a new data indicator field in the single DCI being set to 0, and (iii) a redundancy version field, a modulation and coding scheme field, and a frequency domain resource assignment field corresponding to predetermined values, respectively.

8. The method of claim 5, wherein the HARQ-ACK codebook is received from the terminal on a physical uplink control channel (PUCCH).

9. A terminal in a communication system, the terminal comprising:
a transceiver; and
at least one processor coupled with the transceiver and configured to:
receive, from a base station, a plurality of semi persistent scheduling (SPS) physical downlink shared channel (PDSCH) configurations, wherein the plurality of SPS PDSCH configurations respectively including SPS configuration indexes,
receive, from the base station, a plurality of downlink control information (DCI) formats indicating activations of SPS PDSCHs respectively corresponding to the SPS configuration indexes,
receive, from the base station, a single DCI format indicating a plurality of SPS PDSCH releases,
obtain a hybrid automatic repeat request acknowledgement (HARQ-ACK) codebook including HARQ-ACK information corresponding to the plurality of SPS PDSCH releases, and
transmit, to the base station, the HARQ-ACK codebook,
wherein a location in the HARQ-ACK codebook for the HARQ-ACK information is same as for a corresponding SPS PDSCH reception with a lowest SPS configuration index among the plurality of SPS PDSCH releases, and
wherein the plurality of SPS PDSCH releases are indicated based on a value of a HARQ process number field in the single DCI format.

10. The terminal of claim 9, wherein the at least one processor is further configured to receive, from the base station, a radio resource control (RRC) message including information configuring the HARQ-ACK codebook as semi-static.

11. The terminal of claim 9, wherein the single DCI format is identified as a valid release based on: (i) a cyclic redundancy check (CRC) of the single DCI format being scrambled with a configured scheduling radio network temporary identifier (CS-RNTI), (ii) a new data indicator field in the single DCI being set to 0, and (iii) a redundancy version field, a modulation and coding scheme field, and a frequency domain resource assignment field corresponding to predetermined values, respectively.

12. The terminal of claim 9, wherein the HARQ-ACK codebook is transmitted to the base station on a physical uplink control channel (PUCCH).

13. A base station in a communication system, the base station comprising:
a transceiver; and
at least one processor coupled with the transceiver and configured to:
transmit, to a terminal, a plurality of semi persistent scheduling (SPS) physical downlink shared channel (PDSCH) configurations, wherein the plurality of SPS PDSCH configurations respectively including SPS configuration indexes,
transmit, to the terminal, a plurality of downlink control information (DCI) formats indicating activations of SPS PDSCHs respectively corresponding to the SPS configuration indexes,
transmit, to the terminal, a single DCI format indicating a plurality of SPS PDSCH releases, and
receive, from the terminal, a hybrid automatic repeat request acknowledgement (HARQ-ACK) codebook including HARQ-ACK information corresponding to the plurality of SPS PDSCH releases,
wherein a location in the HARQ-ACK codebook for the HARQ-ACK information is same as for a corresponding SPS PDSCH reception with a lowest SPS configuration index among the plurality of SPS PDSCH releases, and
wherein the plurality of SPS PDSCH releases are indicated based on a value of a HARQ process number field in the single DCI format.

14. The base station of claim 13, wherein the at least one processor is further configured to transmit, to the terminal, a radio resource control (RRC) message including information configuring the HARQ-ACK codebook as semi-static.

15. The base station of claim 13, wherein the single DCI format corresponds to a valid release based on: (i) a cyclic redundancy check (CRC) of the single DCI format being scrambled with a configured scheduling radio network temporary identifier (CS-RNTI), (ii) a new data indicator field in the single DCI being set to 0, and (iii) a redundancy version field, a modulation and coding scheme field, and a frequency domain resource assignment field corresponding to predetermined values, respectively.

16. The base station of claim 13, wherein the HARQ-ACK codebook is received from the terminal on a physical uplink control channel (PUCCH).

* * * * *